(12) United States Patent
Shinn et al.

(10) Patent No.: US 7,094,489 B2
(45) Date of Patent: Aug. 22, 2006

(54) METHOD FOR PRODUCING MEMBRANE ELECTRODE ASSEMBLY

(75) Inventors: Mee-Nam Shinn, Seoul (KR); Byung-Sun Hong, Seoul (KR); Ho-Suk Kim, Seoul (KR)

(73) Assignee: FuelCellPower Co., Ltd., Gyeonggi-Do (KR)

( * ) Notice: Subject to any disclaimer, the term of this patent is extended or adjusted under 35 U.S.C. 154(b) by 585 days.

(21) Appl. No.: 10/221,720

(22) PCT Filed: Feb. 22, 2002

(86) PCT No.: PCT/KR02/00284

§ 371 (c)(1),
(2), (4) Date: Sep. 12, 2002

(87) PCT Pub. No.: WO02/069413

PCT Pub. Date: Sep. 6, 2002

(65) Prior Publication Data

US 2003/0114297 A1    Jun. 19, 2003

(30) Foreign Application Priority Data

Feb. 24, 2001 (KR) ................................. 2001-9533
Aug. 22, 2001 (KR) .............................. 2001-50734

(51) Int. Cl.
*H01M 8/10* (2006.01)
*H01M 4/88* (2006.01)
(52) U.S. Cl. ........................... 429/30; 429/40; 427/115
(58) Field of Classification Search ..................... None
See application file for complete search history.

(56) References Cited

U.S. PATENT DOCUMENTS 5,286,426 A * 2/1994 Rano et al. ................. 264/40.1
5,902,399 A * 5/1999 Courtenay .................... 118/52
6,835,488 B1 * 12/2004 Sasahara et al. .............. 429/39

FOREIGN PATENT DOCUMENTS

JP       1982-118367        7/1982
JP       1993-029006        2/1993

* cited by examiner

*Primary Examiner*—Jonathan Crepeau
(74) *Attorney, Agent, or Firm*—Perkins Coie LLP

(57) ABSTRACT

The present invention relates to a Membrane Electrode Assembly (MEA) which significantly enhances power density as well as structural reliability and method for producing the same. More specifically, it relates to the Membrane Electrode Assembly which has a plurality of protuberances and method for producing the same. The present invention involves making supporting bodies to have a plurality of protuberances on one side of the supporting bodies, forming a catalyst layer on one side of the supporting bodies having the protuberances, interposing a polymer-electrolyte-membrane between the supporting bodies, aligning the supporting bodies for the protuberances to engage each other; and hot-pressing the aligned supporting bodies. The present invention can increase the area of a three-phase boundary in which oxidation-reduction reaction of hydrogen and oxygen occurs and decrease resistance to ion conduction; consequently fuel cells have the characteristic of a large output of power density.

16 Claims, 19 Drawing Sheets

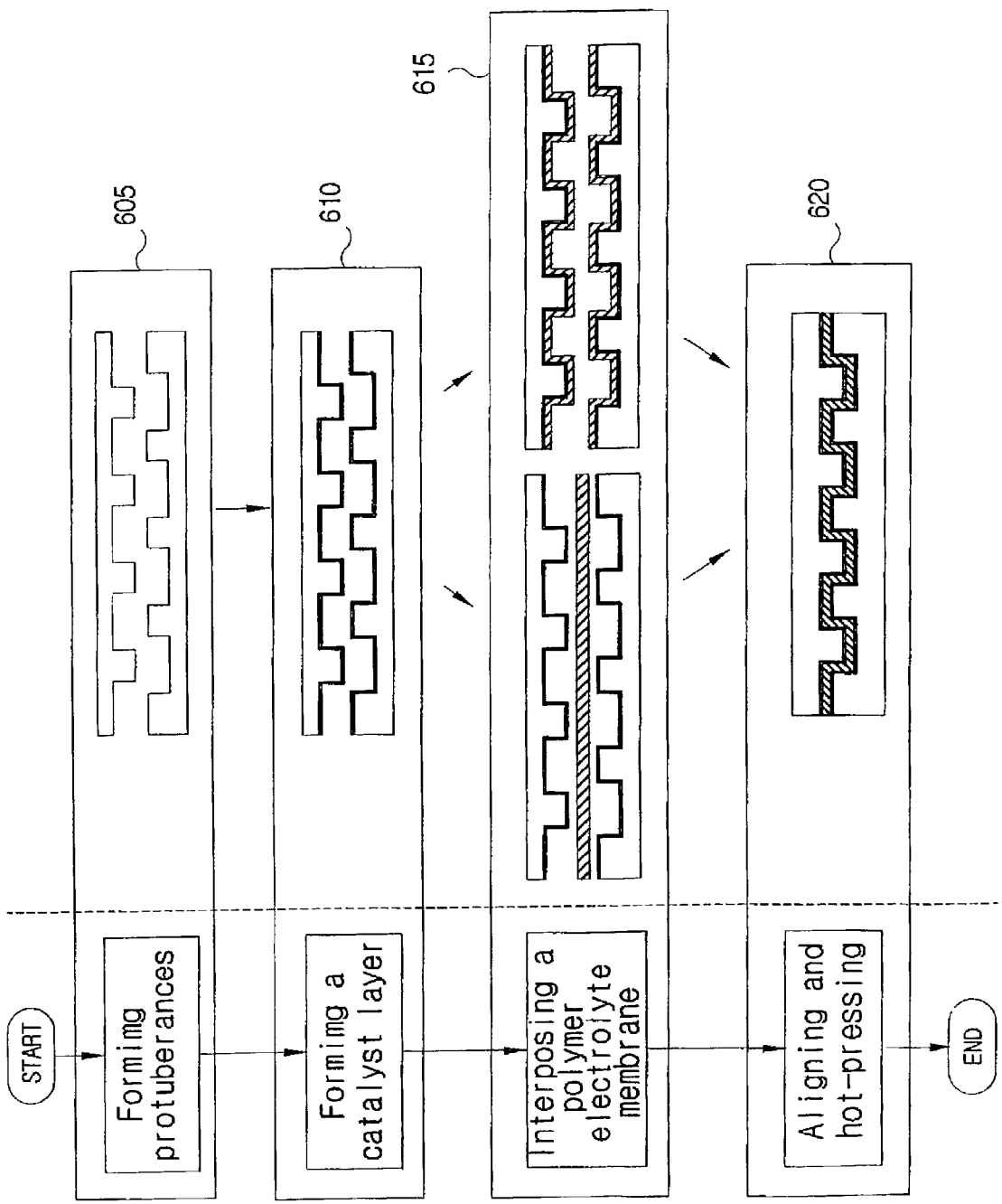

METHOD FOR PRODUCING MEMBRANE ELECTRODE ASSEMBLY

TECHNICAL FIELD

The present invention relates to a Membrane Electrode Assembly (MEA) having the characteristic of a large output of power density and structural reliability and method for producing the same. More specifically, it relates to the Membrane Electrode Assembly, which is used generally in fuel cell power generation by using oxygen and hydrogen as fuel and method for producing the same.

BACKGROUND ART

Recently, problems relating to the rapid increase in the demand for power, depletion of fossil fuels, and environmental pollution have become more and more serious. Therefore, interest in a fuel cell that can resolve the problems of this environmental pollution along with the supply and demand of energy has been increasing more and more.

The general efficiency of an internal combustion engine is 10~20%, however, the fuel cell can increase efficiency over 75% by using the heat generated in the fuel cell. Also, the quantity of nitrogen compound or sulfur compound contained in exhaust gas is very low, and almost no noise or vibration results.

Also, the fuel cell can be produced in various capacities, equipped within a power demand area, and therefore decrease equipment relating to the transmission and transformation of electricity.

The following table 1 represents various kinds of fuel cells.

current and output power density, short warming time, and rapid response to change of load in comparison with the other fuel cells.

Especially, the Polymer Electrolyte Fuel Cells (PEFC) are unnecessary to control an electrolyte and less sensitive to pressure change of reaction gas because a polymer electrolyte membrane is used as an electrolyte. Also, its design is simple, manufacture is easy, and output range is various. Therefore, the Polymer Electrolyte Fuel Cells (PEFC) are applied to various field like a power source for a pollution free vehicle, on-the-spot generation of electric power, a mobile power source, a military power source and so on.

The basic principle of the fuel cell is to make electricity and water from oxygen and hydrogen. Namely, chemical energy is transformed to electric energy directly in steady combustion of fuel and hydrogen supplied from the outside.

The reaction formula in each electrode is as follows.
The reaction formula in anode is as Reaction Formula 1.

$$H^2(g)2\ 2H+2e^-$$  [Reaction Formula 1]

The reaction formula in cathode is as Reaction Formula 2.

[Reaction Formula 2]

$$\frac{1}{2}O_2(g) + 2H^+ + 2e^- 2\ H_2O$$

The total reaction formula is as Reaction Formula 3.

[Reaction Formula 3]

$$H_2(g) + \frac{1}{2}O_2(g) 2\ H_2O$$

TABLE 1

|  | Phosphoric Acid Fuel Cells | Molten Carbonate Fuel Cells | Solid Oxide Fuel Cells | Polymer Electrolyte Fuel Cells | Alkali Fuel Cells |
| --- | --- | --- | --- | --- | --- |
| Abbreviation | PAFC | MCFC | SOFC | PEFC | AFC |
| Gas | Hydrogen | Hydrogen, carbon monoxide | Hydrogen, carbon monoxide | Hydrogen | Hydrogen |
| Electrolyte | Phosphoric acid | Lithium carbonate, Potassium carbonate | Stabilized zirconia | Cationic exchange membrane | Potassium hydroxide |
| Ion | Hydrogen Ion | Carbonic acid ion | Oxygen ion | Hydrogen ion | Hydroxyl ion |
| Operating temperature | About 200° C. | About 650° C. | About 1000° C. | normal temperature~ about 100° C. | normal temperature~ about 100° C. |
| Efficiency | 40~50% | 45~60% | 50~60% | 40~60% | 45~60% |
| Materials | City gas LPG etc | City gas, LPG, coal etc | City gas, LPG etc | City gas, LPG etc | Hydrogen |

Referring to table 1, various kinds of fuel cells are as follows. That is, they include Molten Carbonate Fuel Cells (MCFC) which operate in high temperature over 600° C., Phosphoric Acid Fuel Cells(PAFC) which operate in comparatively low temperature under 200° C., Solid Oxide Fuel Cells(SOFC) and Polymer Electrolyte Fuel Cells(PEFC) and so on. Also, Direct Methanol Fuel Cells (DMFC) use methanol as the fuel.

Over all, the Polymer Electrolyte Fuel Cells (PEFC) use a polymer electrolyte membrane having the characteristic of exchanging a hydrogen ion as the electrolyte. Also, the Polymer Electrolyte Fuel Cells (PEFC) are called various names like Solid Polymer Electrolyte Fuel Cells (SPEFC) or Proton Exchange Membrane Fuel Cells (PEMFC), however, they will be called Polymer Electrolyte Fuel Cells (PEFC) in the following.

The Polymer Electrolyte Fuel Cells(PEFC) have a low operating temperature of about 80° C., high efficiency, good FIG. 1 is a schematic cross section of a unit cell that consists of conventional fuel cells.

The fuel cell stack includes a plurality of membrane electrode assemblies piled. And the fuel cell comprising only one membrane electrode assembly is called a unit cell. The real fuel cell stack has the structure of unit cells piled.

The voltage of one membrane electrode assembly is about 0.7V, and the output voltage of the stack increases in proportion to the number of membrane electrode assemblies. The current is in proportion to the area of the membrane electrode assembly, therefore the wider the area is, then the more the current is generated. Generally, the current density of membrane electrode assembly is about 200–500 mA/cm$^2$.

Referring to FIG. 1, in the anode 100 of unit cell electron is generated as the result of oxidation reaction occurring in supplying and exhausting hydrogen. And the water is generated as the result of a reduction reaction occurring in supplying and exhausting oxygen.

The oxidation and reduction occurs in the catalyst layer 130, which is formed between two porous carbon electrodes and the polymer electrolyte membrane The polymer electrolyte membrane 120 delivers the hydrogen ionized in the anode 100 to a cathode 110.

The membrane electrode assembly is manufactured by hot-pressing of the polymer electrolyte 120 and the catalyst layer 130. The anode 100 and the cathode 110 of PEFC are comprised1 of the catalyst layer 130 and the supporting bodies 100.

Separators (also, they are called bipolar plates) 160, 165 on which a flow field 140 is formed, can supply hydrogen and oxygen and exhaust the water and is located outside of the membrane electrode assembly.

The separator is a conductive plate including the flow field on one side, and the hydrogen and oxygen can move through the flow field. The separator conducts the electron generated in anode to cathode, supports the membrane electrode assembly, supplies two electrodes with fuel and oxygen, and removes water generated while operating the fuel cell.

The unit cell includes the membrane electrode assembly, the separator, and a gasket 170,180 preventing the gas or the liquid from flowing out. Also, the unit cell includes a copper plate 190,195 which can fix the unit cell in the end portion of the unit cell.

The fuel cell stack is manufactured by piling the unit cells. The hydrogen gas channel is formed on one side of the separator, and the oxygen gas channel is formed on the other side of the separator.

The problem with the past technique will be explained in connection with improving the performance of membrane electrode assembly.

In order to improve performance of the membrane electrode assembly, it is necessary to promote an oxidation-reduction reaction through the efficient use of a catalyst, decrease contact resistance between the polymer electrode assembly and the electrodes, increase the area of the three-phase boundary of gas-electrolyte-catalyst, and lessen the thickness of the polymer electrode assembly.

Therefore, research and development have been undertaken to improve the polymer electrolyte membrane, promote the rate of catalyst utilization, improve the catalyst coating process, increase the area of the three-phase boundary of gas-electrolyte-catalyst, and decrease contact resistance between the polymer electrode assembly and the electrodes.

However, improving the performance of the membrane electrode assembly through the above-mentioned method may be difficult.

In the following, conventional representative methods for improving performance of the membrane electrode assembly and the problems corresponding to the methods will be explained.

The first method is to improve the polymer electrolyte membrane. The polymer electrolyte membrane must have high conductivity of hydrogen ion and almost no conductivity of electron. Also the polymer electrolyte membrane must have less movement of reaction gas or water than that of an ion but good mechanical and chemical stableness.

The Nafion membrane (Dupont Co.) used in PEFC is perfluorinated sulfonic acid series. The hydrogen must be hydrated to be conducted in the Nafion membrane and passes through in the Nafion in the form of $H_3O^+$.

Therefore, if the polymer electrolyte membrane becomes dry, the conductivity of hydrogen ion becomes low, and the polymer electrolyte membrane will contract to increase contact resistance between the polymer electrolyte membrane and the electrodes. That is to say, the thinner the polymer electrolyte membrane is, the less the ohmic resistance of hydrogen ion is, and consequently the current density increases.

However, it is difficult to lower the thickness of polymer electrolyte membrane because of mechanical solidity. The thickness of Gore-Select membrane (Gore Associate Co.) having a good mechanical property of matter is about 20~30 µm.

Accordingly, a new polymer electrolyte membrane needs to be developed which does not require humidification, can be operated in high temperature over 200° C., and has good mechanical and chemical duration. However, there is no the polymer electrolyte membrane that complies with the qualifications mentioned above.

The second method is to improve the efficiency of a catalyst. The oxidation and reduction of hydrogen gas and oxygen gas occurs in catalyst layer. Therefore, the efficiency of a catalyst is very important.

However, it is necessary to improve the efficiency of a catalyst by improving a dispersion degree of the catalyst because the catalyst is a precious metal.

The representative method for improving the efficiency of a catalyst is to use supported Pt/C whereby platinum is coated on a surface on a minute carbon particle of 2~5 nm size (Vulcan XC-72, Cabot Co.).

However, the above-mentioned method that can increase the effective surface area of a platinum particle by using a small quantity of a catalyst can't give prominent performance improvement.

A uniform and thin catalyst layer can decrease the contact resistance. Namely, lessening the thickness of the polymer electrolyte membrane can decrease the voltage drop in PEFC.

However, the thickness of the polymer electrolyte membrane must be sufficiently thick to support the membrane electrode assembly. Therefore, the reproducibility and stableness of a method for producing the membrane electrode assembly restricts the thickness of the polymer electrolyte membrane to be hundreds of micrometer.

The third method is to improve the degree of homogeneousness. Namely, during hot-pressing the degree of homogeneousness can be increased by controlling temperature, pressure, time, and humidity. However, a high possibility exists that the degree of homogeneousness becomes low and contact resistance becomes high in a preponderance of pressure because the polymer electrolyte and the electrodes are contacted on flat side.

As mentioned above, the method for improving the performance of the membrane electrode assembly is concentrated on the improvement of material comprising the membrane electrode assembly or the activation of reaction centering around the catalyst.

On the contrary, no method exists for increasing a reaction effective method or decreasing the contact resistance through improving the structure of the membrane electrode assembly.

DISCLOSURE OF THE INVENTION

The present invention is devised to resolve the above-mentioned problems.

An object of the present invention is to provide the membrane electrode assembly that can increase the oxidation and reduction reaction area to improve the current density and method for producing the same.

Another object of the present invention is to provide the method for forming the catalyst layer without reducing catalyst efficiency.

Still another object of the present invention is to provide the membrane electrode assembly including a plurality of protuberances in the shape of grooves instead of a conventional membrane electrode assembly including the flat three-phase boundary.

Still another object of the present invention is to increase the reaction surface area of the three-phase boundary in which the electric chemical reaction occurs.

Still another object of the present invention is to provide the producing method having a good reproducibility by decreasing the sliding occurring in the hot-pressing process of membrane electrode assembly.

Still another object of the present invention is to provide the membrane electrode assembly having a structural reliability against exterior vibration generated while operating the fuel cell or assembling of the stack.

Still another object of the present invention is to decrease ohmic resistance to hydrogen ion passing through the polymer electrolyte membrane by decreasing the thickness of the polymer electrolyte membrane.

Still another object of the present invention is to increase the output density of the membrane electrode assembly compared with a conventional flat membrane electrode assembly coated with the same material catalyst.

Still another object of the present invention is to lessen the number of the membrane electrolyte assemblies and the separators needed in manufacturing the fuel cell stack as compared with a conventional flat membrane electrode assembly in the same output power.

Still another object of the present invention is to produce a new product in super small-sized fuel cell field by applying the membrane electrode assembly according to the present invention.

Still another object of the present invention is for the present invention to be applied to cells which supply fuel through a porous electrode, for example, PEFC using fuel in a gas state, DMFC using fuel in a liquid state, abd SOFC using electrolyte in a solid state.

To achieve the object in accordance with one preferred embodiment of the present invention, a membrane electrode assembly (MEA) and method for producing the same is provided comprising the steps of (a) forming a plurality of protuberances on one side of supporting bodies, (b) forming a catalyst layer on one side of the supporting bodies on which the plurality of protuberances are formed, (c) interposing a polymer electrolyte membrane between the supporting bodies, (d) aligning the supporting bodies for the protuberances to engage with each other and (e) hot-pressing the supporting bodies, wherein a three phase boundary corresponding to the protuberances is formed.

Also, said (a) step further comprises the steps of coating one side of the supporting bodies with a dry film, exposing the one side of the supporting bodies, developing the dry film, and etching the one side of the supporting bodies physically.

The dry film can be developed by a spraying developer, the supporting bodies can be etched by a sand blaster, and the etching depth can be hundreds of micrometers.

Also, said (a) step can further comprise the step of combining a plate to the one side of the supporting bodies on which the protuberances are formed.

Furthermore, said (a) step can be performed by press processing, said (b) step can be performed by spraying the one side of the supporting bodies with a catalyst mixed liquid while rotating the supporting bodies, and said (c) step can be performed by spraying the one side of supporting bodies with a polymer electrolyte liquid Moreover, said (d) step can be performed by using a pre-formed aligning mark and using a shape of a light source passing through a pre-formed aligning hall.

Also, said (d) step can be performed by inserting aligning members into the pre-formed aligning halls, such that each aligning member has a plurality of protrusions different in size and height.

Also, said (e) step can be performed by inserting a spacer between the supporting bodies, whereby the spacer cam make thickness of the polymer electrolyte membrane uniform.

Also, the protuberances can be at least one selected from a quadrangular prism, a triangular prism, a trapezoid prism, a hexahedron, and a quadrangular prismoid.

An aspect ratio of the protuberances can be from 0.01 to 6 or from 0.05 to 3. And, a width of the protuberances can be from 50 µm to 500 µm or from 100 µm to 200 µm. Also, a thickness of the polymer electrolyte membrane can be from 10 µm to 200 µm.

Preferably a membrane electrode assembly is made according to the present invention. Also, a unit cell, a fuel cell stack, a fuel cell system and a sensor that all include the membrane electrode assembly can possibly be made.

In accordance with another preferred embodiment of present invention, the method for producing membrane electrode assembly generating an electric current by electric chemical reaction comprises the step of forming a plurality of protuberances on one side of supporting bodies, wherein the three phase boundary corresponding to the protuberances is formed.

Here, the shape of the protuberances can be at least one selected from a quadrangular prism, a triangular prism, a trapezoid prism, a hexahedron, and a quadrangular prismoid.

In accordance with still another preferred embodiment of the present invention, the method for producing a membrane electrode assembly generating an electric current by electric chemical reaction comprises the steps of forming a catalyst layer on one side of supporting bodies having protuberances, wherein said forming step is performed by spraying the one side of supporting bodies with catalyst mixed liquid by rotating the supporting bodies.

In accordance with still another preferred embodiment of present invention, the method for producing a membrane electrode assembly generating an electric current by electric chemical reaction comprises the steps of interposing a polymer-electrolyte-membrane between supporting bodies on one side of which a plurality of protuberances are formed, wherein said interposing step is performed by spraying the one side of supporting bodies with the catalyst mixed liquid by rotating the supporting bodies.

In accordance with still another preferred embodiment of present invention, the method for producing a membrane electrode assembly generating an electric current by electric chemical reaction comprises the steps of aligning supporting bodies on one side of which a plurality of protuberances are formed to engage with each other, wherein said aligning step is performed by using a pre-formed aligning mark.

In accordance with still another preferred embodiment of present invention, the method for producing a membrane electrode assembly generating an electric current by electric chemical reaction comprises the steps of aligning supporting bodies on one side of which a plurality of protuberances are to engage with each other, wherein said aligning step is performed by using a shape of a light source passing through a pre-formed aligning hall.

In accordance with still another preferred embodiment of present invention, the method for producing membrane electrode assembly generating an electric current by electric chemical reaction comprises the steps of aligning supporting bodies on one side of which a plurality of protuberances are formed to engage with each other, wherein said aligning step is performed inserting aligning members into pre-formed aligning halls.

In accordance with still another preferred embodiment of present invention, the method for producing a membrane electrode assembly generating an electric current by electric chemical reaction comprises the steps of hot-pressing aligned supporting bodies on one side of which a plurality of protuberances are formed for the supporting bodies to engage with each other, wherein said hot-pressing step is performed by inserting spacers between supporting bodies to a uniform thickness of a polymer electrolyte membrane.

BRIEF DESCRIPTION OF THE DRAWINGS

The above objects and other advantages of the present invention will become more apparent in detailed descriptions of the preferred embodiments thereof with reference to the attached drawings, in which:

FIG. 6 represents a process producing membrane electrode assembly in accordance with one preferred embodiment of the present invention.

THE BEST MODES FOR CARRYING OUT THE INVENTION

Hereinafter, preferred embodiments of the present invention will be described in more detail with reference to the accompanying drawings, but it is understood that the present invention should not be limited to the following embodiments To help in understanding the present invention, preferred embodiments of the present invention will be described centering around PEFC (Polymer Electrolyte Fuel Cells), however, it should be understood that the present invention should not be limited to the PEFC (Polymer Electrolyte Fuel Cells).

That is to say, the present invention can be applied to cells that supply fuel through a porous electrode, for example, PEFC using fuel in a gas state, DMFC using fuel in a liquid state, and SOFC using an electrolyte in a solid state.

Figure 2:
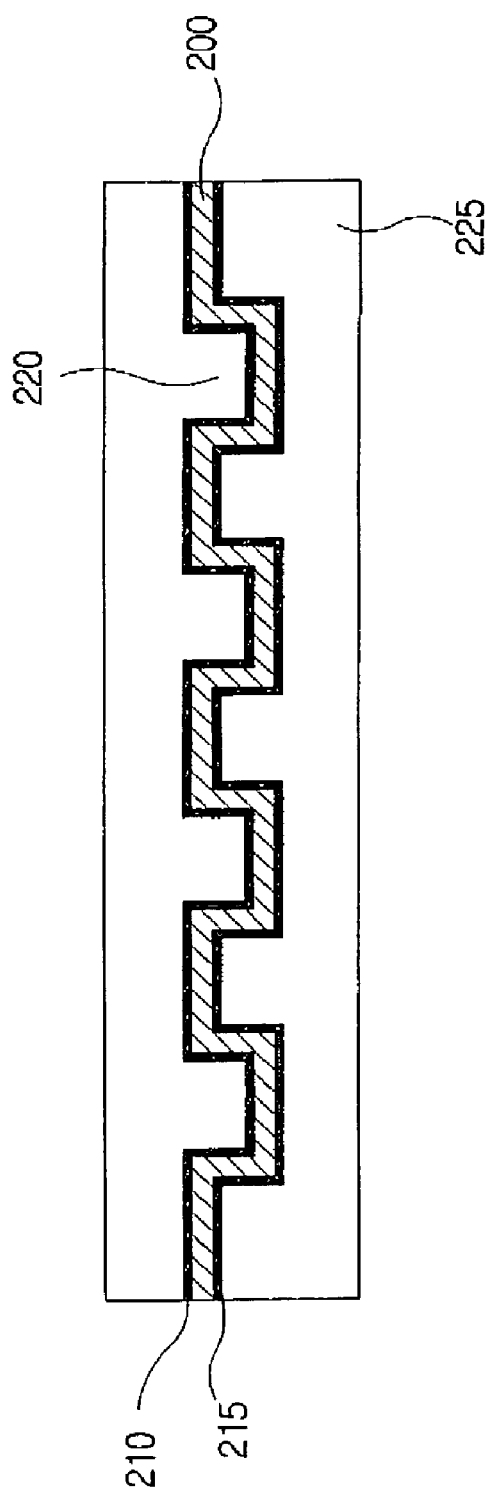
FIG. 2 is a schematic cross section of membrane electrode assembly in accordance with one preferred embodiment of the present invention.

FIG. 2 is a schematic cross section of a membrane electrode assembly in accordance with one preferred embodiment of the present invention.

The present invention provides a membrane electrode assembly of which an electrode, supporting bodies, and an electrolyte have a regular three dimensional shape, and engage each other strictly and method for producing the same, while a conventional membrane assembly electrode comprises flat electrode, supporting bodies, and polymer electrolyte membrane.

Through the three dimensional membrane electrode assembly, a reaction area that which is a contact area between an electrode and an polymer electrolyte membrane can increase and a thickness of polymer electrolyte membrane can decraese in comparison with a conventional flat membrane electrode assembly As the electrodes engage each other strictly, the present invention can decrease sliding during hot-pressing, and provide structural reliability during working.

The membrane electrode assembly in accordance with the present invention can be manufactured to have a three-dimensional three-phase boundary in order to maximize the three-phase boundary in which fuel, electrode, and polymer electrolyte meet.

Figure 1:
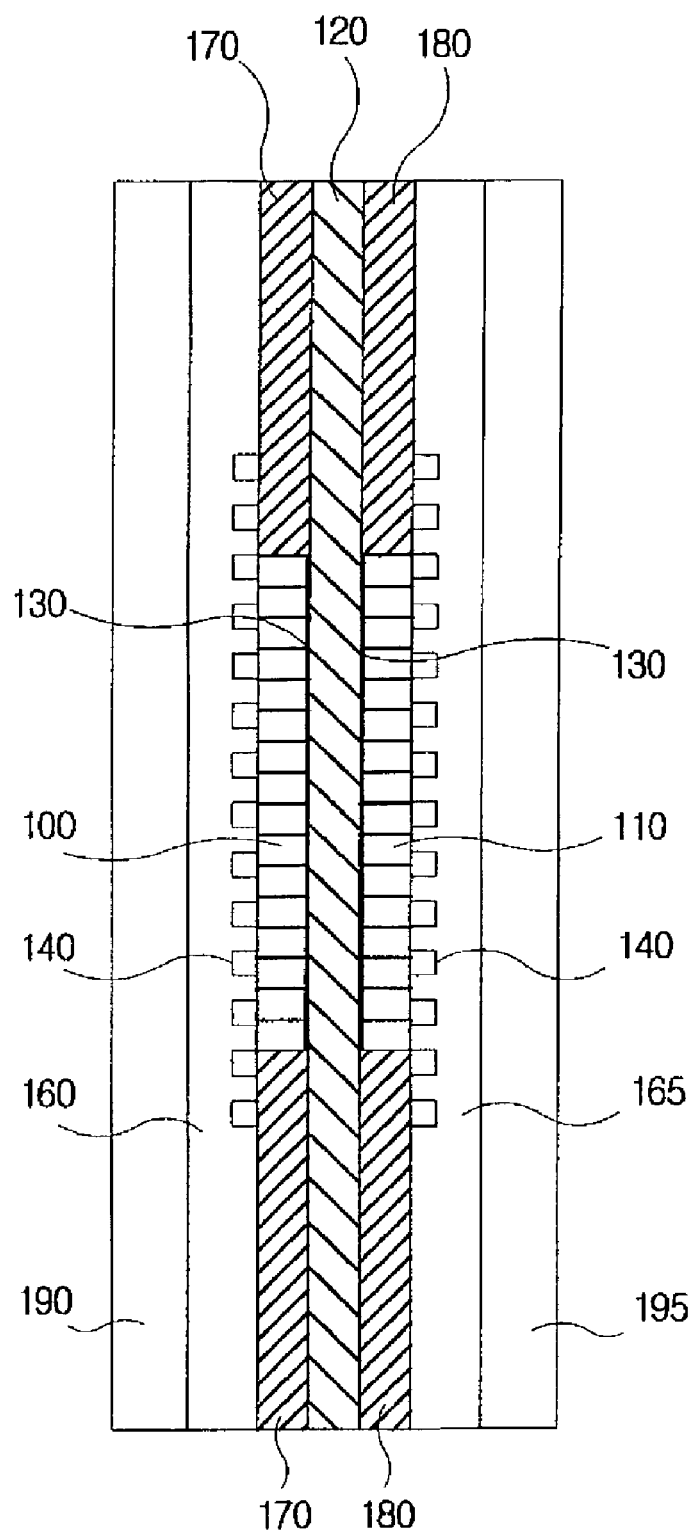
FIG. 1 is a schematic cross section of unit cell that composes hitherto fuel cells.

Referring to FIG. 2, the electrode has a plurality of protuberances that engage each other precisely; thus differing from FIG. 1, which represents a conventional membrane electrode assembly having a flat three phase boundary. Namely, the electrode has the structure that three-phase boundaries of a groove shape are engaged with each other.

A manufacturing process includes a photolithography process using supporting bodies of electrode, for example, porous carbon paper, etching process using sand blaster, catalyst forming process, aligning process and hot-pressing process.

Referring to FIG. 2, in order to maximize a reaction area a plurality of protuberances are formed repeatedly on supporting bodies of anode 220 and supporting bodies of cathode 225. Therefore, the polymer electrolyte membrane is interposed between the anode and the cathode, wherein the anode and the cathode can engage each other and are put together.

Namely, the polymer electrolyte membrane 200 is formed three dimensionally to maximize the reaction area of the three-phase boundary.

Also, the structure mentioned above can lessen the volume of unit cell and minimize a reduction in voltage the of polymer electrolyte membrane.

In accordance with one preferred embodiment of the present invention, the electrode referred in FIG. 2 has the protuberances of a quadrangular prism, and the catalyst layers 210, 215 are formed on both sides adjacent to the polymer electrolyte membrane.

Therefore, the supporting bodies of anode 220 and the supporting bodies of cathode 225 have a plurality of protuberances. Also, preferably the supporting bodies of anode 220 and the supporting bodies of cathode 225 have the characteristics of porosity for diffusion. In accordance with one preferred embodiment of the present invention, preferably carbon paper is used, which is stronger than pliable carbon cloth for the supporting bodies.

FIG. 3a–FIG. 3e represent shapes of polymer electrolyte membrane corresponding to various protuberances.

Figure 3A:
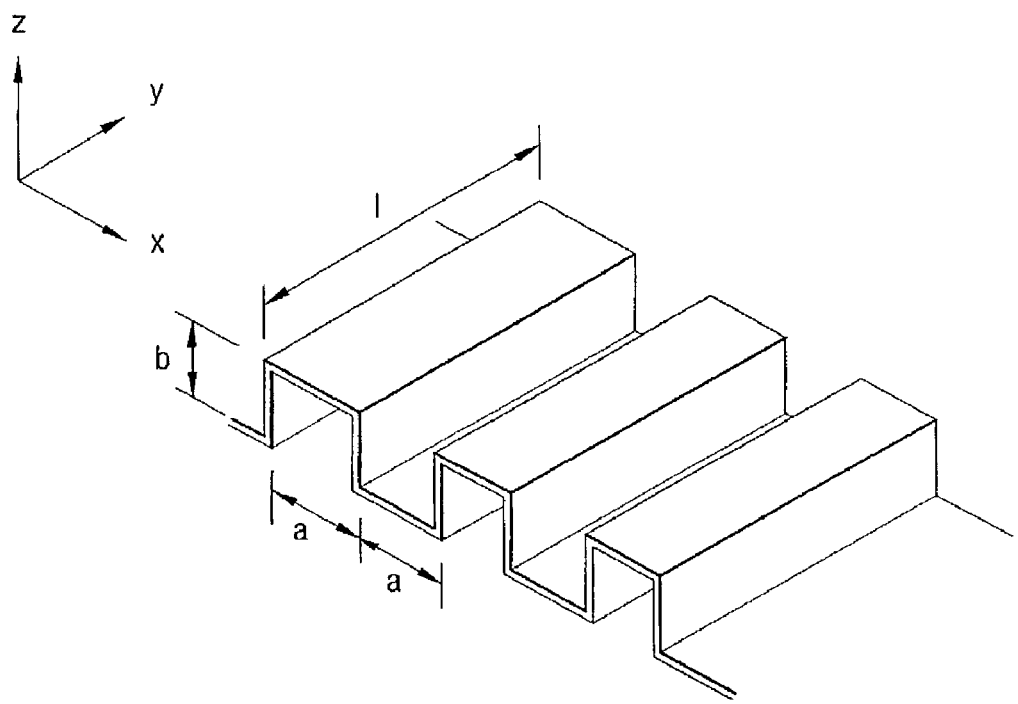
FIG. 3a represents the shape of a polymer electrode membrane which has the construction that a triangular prism is repeated in accordance with one preferred embodiment of the present invention.
Figure 3B:
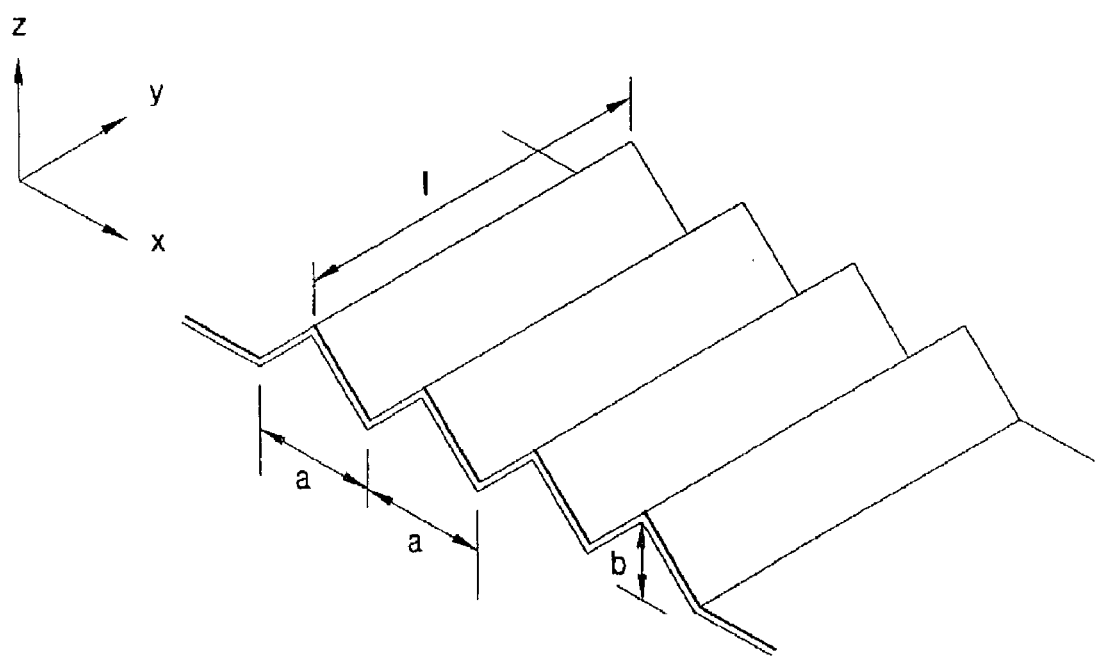
FIG. 3b represents the shape of a polymer electrode membrane which has the construction that a quadrangular prism is repeated in accordance with another preferred embodiment of the present invention.
Figure 3C:
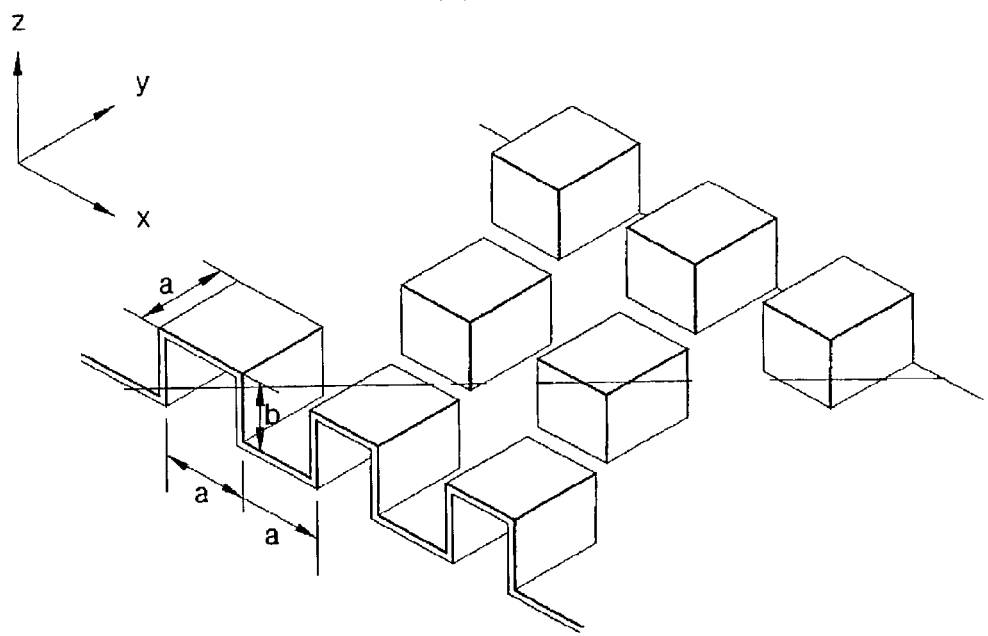
FIG. 3c represents the shape of a polymer electrode membrane which has the construction that a trapezoid prism is repeated in accordance with still another preferred embodiment of the present invention.

FIG. 3a represents the shape of polymer electrolyte membrane corresponding to the protuberances of quadrangular prism, FIG. 3b represents the shape of polymer electrolyte membrane corresponding to the protuberances of triangular prism, and FIG. 3c represents the shape of polymer electrolyte membrane corresponding to the protuberances of hexahedron.

Table 2 represents a ratio of the increased surface area of a three-dimensional boundary to the surface area of a flat boundary.

TABLE 2

| The shape of protuberances | The surface area of three dimensional boundary/The surface area of flat boundary |
|---|---|
| Quadrangular prism (FIG. 3a) | $1 + b/a$ |
| Triangular prism (FIG. 3b) | $2(b/a)/\sin\theta$ ($b/a = 0.5 \tan\theta$) |
| Hexahedron (FIG. 3c) | $1 + 2b/a$ |

The protuberances of quadrangular prism, the length of which in X direction is 'a', the length of which in Y direction is 'l' and the height of which in Z direction is 'b', are formed repeatedly.

The protuberances of triangular prism, the length of which in X direction is 'a', the length of which in Y direction is 'l' and the height of which in Z direction is 'b', are formed repeatedly. Also, an angle of inclination is determined by aspect ratio (b/a) in triangular prism.

The protuberances of hexahedron quadrangular prism, the length of which in X and Y directions is 'a' and the height of which in Z direction is 'b', are formed repeatedly.

Figure 3D:
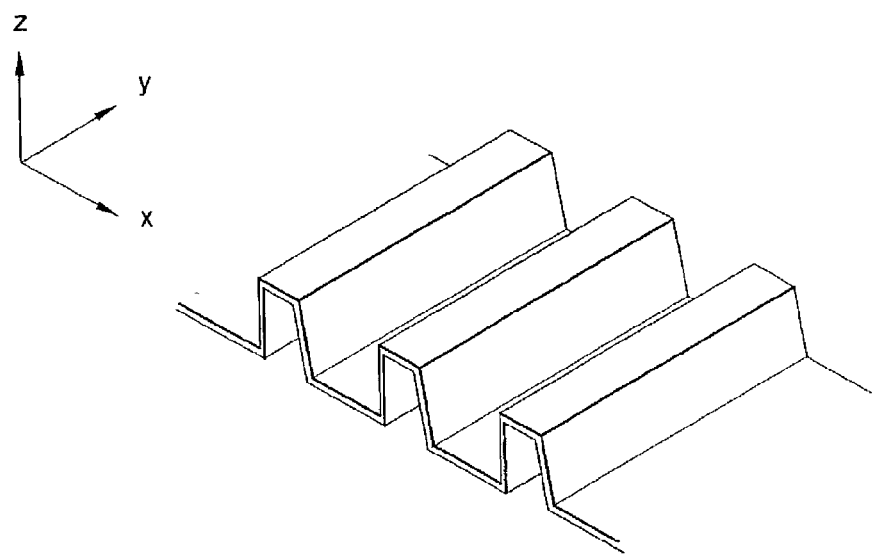
FIG. 3d represents the shape of a polymer electrode membrane which has the construction that a hexahedron is repeated in accordance with still another preferred embodiment of the present invention.
Figure 3E:
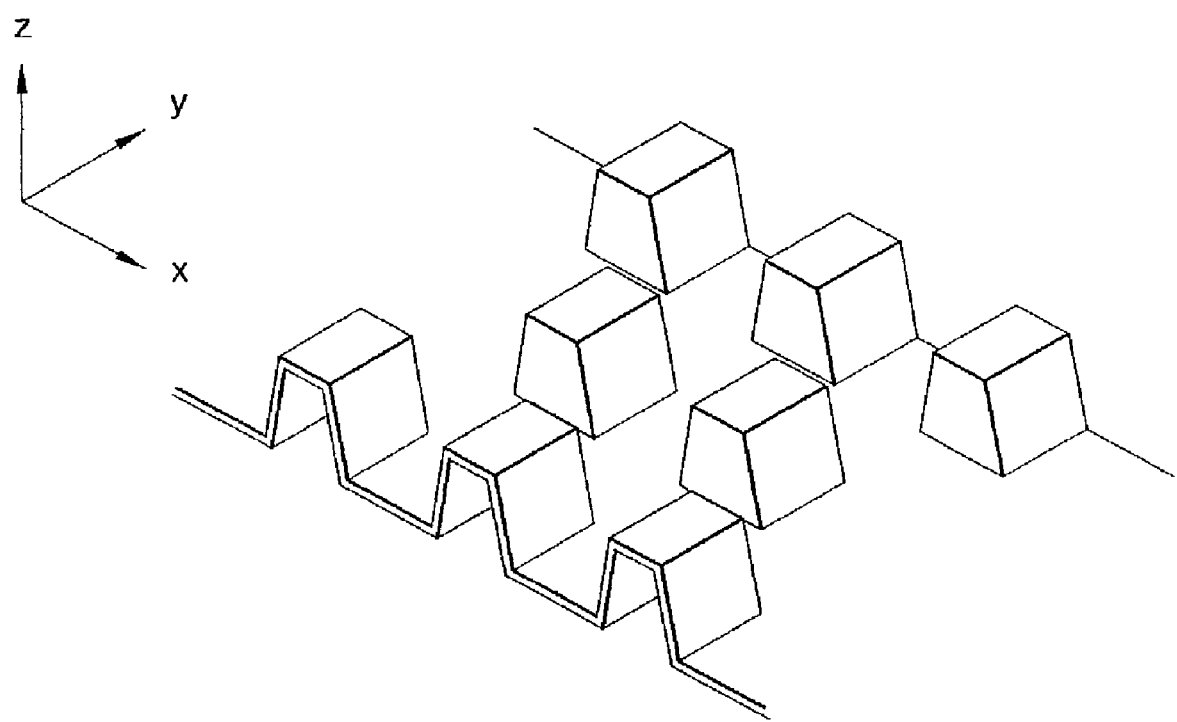
FIG. 3e represents the shape of a polymer electrode membrane which has the construction that a quadrangular prismoid is repeated in accordance with still another preferred embodiment of the present invention.

FIG. 3d represents the shape of polymer electrolyte membrane corresponding to the protuberances of trapezoid prism, and FIG. 3e represents the shape of polymer electrolyte membrane corresponding to the protuberances of quadrangular prismoid.

Referring to FIG. 3a–FIG. 3e, the protuberances of hexahedron or quadrangular prismoid have wider area of three-phase boundary than that of the protuberances of quadrangular prism or triangular prism.

Accordingly, if the other conditions including the aspect ratio are the same, the increasing ratio of surface area in the protuberances of hexahedron or quadrangular prismoid is bigger than that of the protuberances of quadrangular prism or triangular prism.

Also, the protuberances can prevent the supporting bodies from sliding during the hot pressing process and provide a production method having excellent reproducibility.

The shape of the polymer electrolyte membrane is determined by the shape of the protuberances formed on the supporting bodies. Of course, the shape of the protuberances on one side of supporting bodies is not limited to these embodiments. Modification within the spirit of the invention will be apparent to those skilled in the related technical field.

Figure 4:
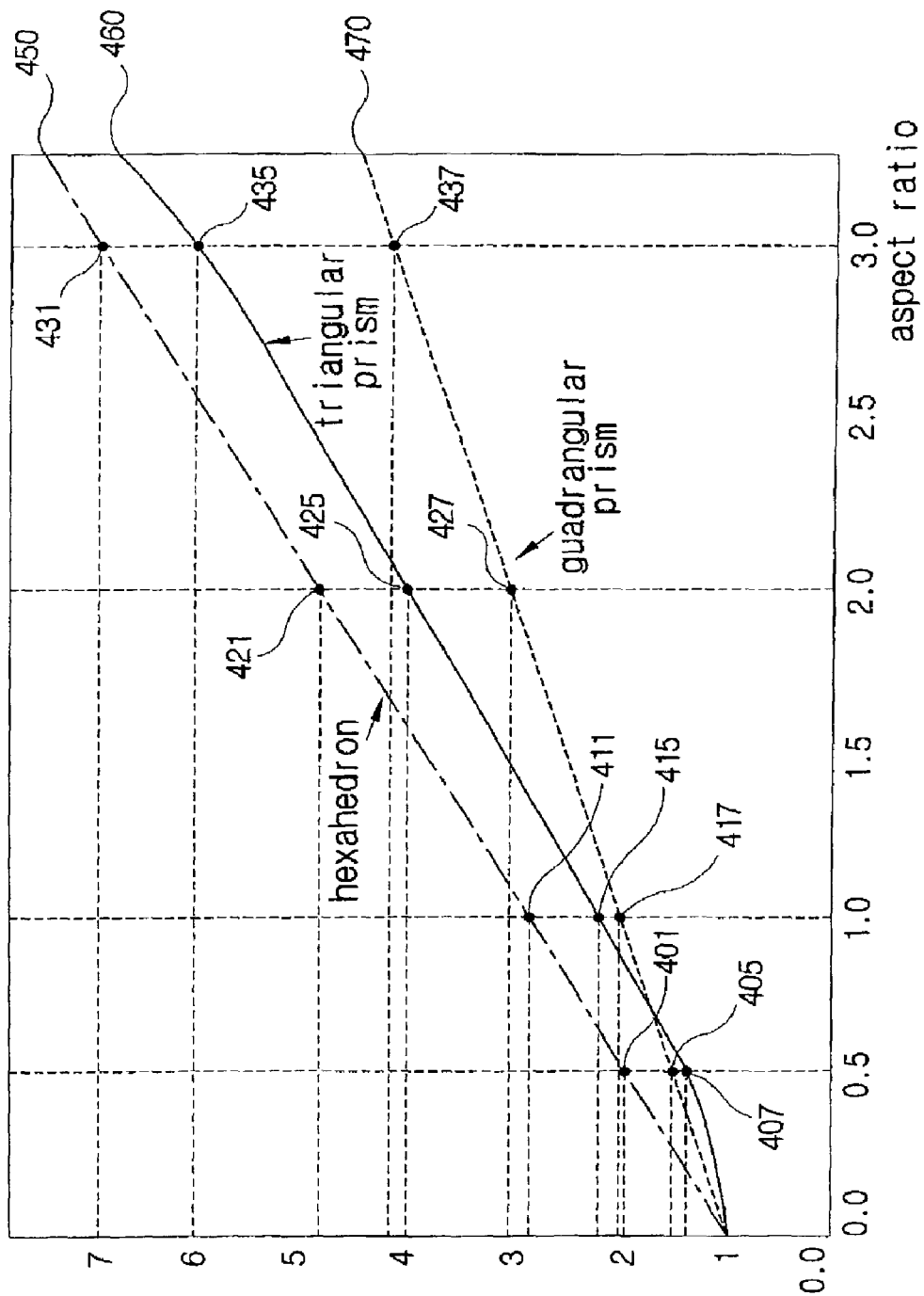
FIG. 4 is a graph illustrating increasing the ratio of surface area according to aspect ratio of polymer electrode membrane in accordance with one preferred embodiment of the present invention.

FIG. 4 is a graph representing the increasing ratios of the surface area in accordance with the aspect ratio of protuberances.

Referring to FIG. 4, the representative increasing ratio of surface area corresponding to the protuberances of quadrangular prism, triangular prism, trapezoid prism is illustrated.

According to the present invention, the area of reaction surface in the electrode that has the protuberances increases in comparison with the flat electrode. If the shape of protuberances is the same, a surface area is dependent on the shape of protuberances.

As the aspect ratio is higher, the wider the surface area is gained. Thereby, the aspect ratio means the ratio of a base side to the height.

If the protuberances have the same conditions including aspect ratio, the surface area of the hexahedron protuberances increase more than that of the quadrangular or triangular prism protuberances.

Referring to FIG. 4, when the aspect ratio is 0.5, the increasing ratio of surface area is as follows. The protuberances of quadrangular are 1.5 times 405, the protuberances of triangular prism are 1.4 times ($\theta=45°$) 407, and the protuberances of hexahedron are 2 times 401. Therefore, the increasing ratio of the surface area in the protuberances of hexahedron is highest, When the aspect ratio is 1, the increasing ratio of surface is as follows. In the protuberances of quadrangular it is 2 times 417, in the protuberances of triangular prism it is 2.2 times ($\theta=63.5°$)415, and in the protuberances of hexahedron it is 3 times 411.

When the aspect ratio is 2, the increasing of surface is as follows. In the protuberances of quadrangular it is 3 times 427, in the protuberances of triangular prism it is 4.1 times ($\theta=76°$)415, and in the protuberances of hexahedron it is 5 times 421.

When the aspect ratio is 3 the increasing of surface is as follows. In the protuberances of quadrangular it is 4 times 437, in the protuberances of triangular prism it is 6.1 times ($\theta=80.5°$)407, and in the protuberances of hexahedron it is 7 times.

The bigger the aspect ratio is, the bigger the increasing ratio of surface area; however, it is difficult to make aspect ratio more than 3 because of restriction of electrode thickness and difficulty of manufacturing.

Also the increasing ratio of surface area in trapezoid prism is similar to that in quadrangular prism, and the increasing ratio of surface area in quadrangular prismoid is similar to that in hexahedron.

Generally, the thickness of the porous electrode which is used in Membrane Electrode Assembly is from 190 μm to 380 μm, the thickness of Nafion membrane, that is a polymer electrolyte membrane is from 50 μm to 250 μm, and the thickness of catalyst layer which is formed on an electrode is from 20 μm to 40 μm.

The shape mentioned above is a three-dimensional shape of polymer electrolyte membrane interposed between electrodes. The size of the upper electrode and the lower electrode must be designed considering the shape of the polymer electrolyte membrane.

FIG. 5a–FIG. 5d represent the structure of membrane electrode assembly in which the upper electrode and lower electrode engage each other.

In the electrode of membrane electrode assembly in accordance with the present invention, the width of the protuberances is 'a', the height of the protuberances is 'b', and the width of the grooves corresponding to the protuberances is 'c'.

Referring to FIG. 5a–FIG. 5d, the thickness of electrode is 't'+b' because the height of the protuberances is 'b'. The thickness of polymer electrolyte membrane is 'pt' and the aspect ratio of the protuberances is 'b/a'.

Figure 5A:
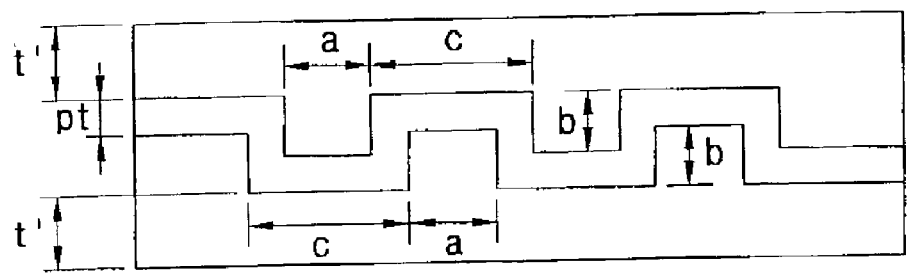
FIG. 5a is a cross section of membrane electrode assembly when electrode thickness (t'+b) is 190 μm, polymer electrolyte membrane thickness is 50 μm, and protuberances 1 are in accordance with one preferred embodiment of the present invention.

FIG. 5a represents the section view of membrane electrode assembly of which the electrode thickness (t'+b) is 190 μm, the polymer electrolyte membrane thickness is 50 μm, and the aspect ratio of the protuberances is 1.

Referring to FIG. 5a, the thickness of the electrode (t'+b) is 190 μm, and the aspect ratio of the protuberances is 1.

The prominence and depression of the protuberances is as follows. Namely, 'a' is 100 μm, 'b' is 100 μm, 'c' is 200 μm, 't' is 90 μm, and the aspect ratio is 1. Also, it is preferable for 'pt', the thickness of the polymer electrolyte membrane to be 50 μm.

Figure 5B:
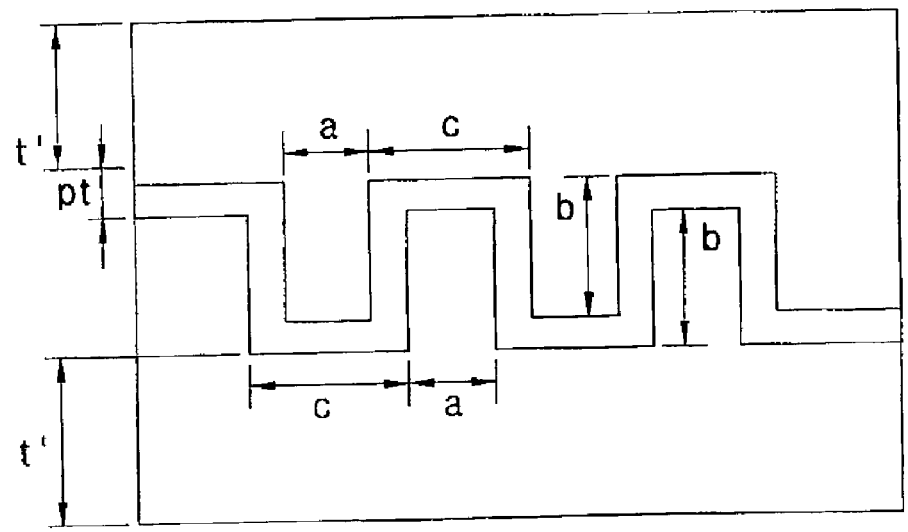
FIG. 5b is a cross section of membrane electrode assembly when electrode thickness (t'+b) is 380 μm, polymer electrolyte membrane thickness is 50 μm, and aspect ratio of protuberances 2 is in accordance with one preferred embodiment of the present invention.

FIG. 5b represents the section view of membrane electrode assembly of which the electrode thickness (t'+b) is 380 μm, the polymer electrolyte membrane thickness is 50 μm, and the aspect ratio of the protuberances is 2.

Referring to FIG. 5b, the thickness of the electrode (t'+b) is 380 μm, and the aspect ratio of the protuberances is 2.

The prominence and depression of the protuberances is as follows. Namely, 'a' is 100 μm, 'b' is 200 μm, 'c' is 200 μm, 't' is 180 μm, and aspect ratio is 2. Also, it is preferable for 'pt', the thickness of the polymer electrolyte membrane to be 50 μm.

Figure 5C:
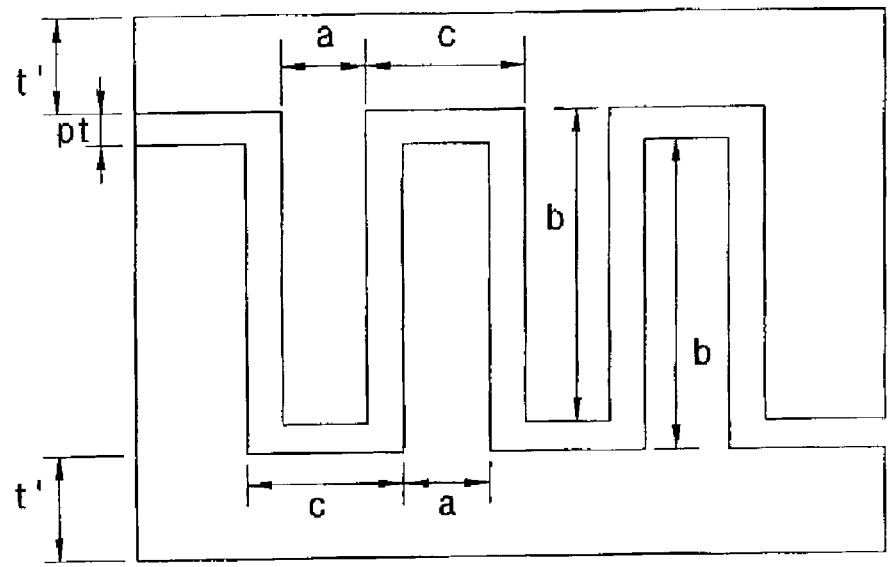
FIG. 5c is a cross section of membrane electrode assembly when electrode thickness (t'+b) is 380 μm, polymer electrolyte membrane thickness is 50 μm, and aspect ratio of protuberances 3 is in accordance with one preferred embodiment of the present invention.

FIG. 5c represents the section view of membrane electrode assembly of which the electrode thickness (t'+b) is 380 μm, the polymer electrolyte membrane thickness is 50 μm, and the aspect ratio of the protuberances is 3.

Referring to FIG. 5c, the thickness of the electrode (t'+b) is 380 μm, and the aspect ratio of the protuberances is 3.

The prominence and depression of the protuberances is as follows. Namely, 'a' is 100 μm, 'b' is 300 μm, 'c' is 200 μm, "t" is 80 μm, and the aspect ratio is 3. Also, it is preferable for 'pt', the thickness of polymer electrolyte membrane to be 50 μm.

Figure 5D:
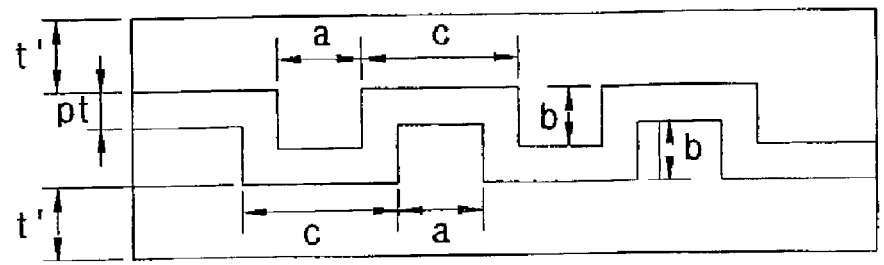
FIG. 5d is a cross section of membrane electrode assembly when electrode thickness (t'+b) is 380 μm, polymer electrolyte membrane thickness is 100 μm, and aspect ratio of protuberances 1 is in accordance with one preferred embodiment of the present invention.

FIG. 5d represents the section view of membrane electrode assembly of which the electrode thickness (t'+b) is 380 μm, the polymer electrolyte membrane thickness is 100 μm, and the aspect ratio of the protuberances is 1.

Referring to FIG. 5d, the thickness of the electrode (t'+b) is 380 μm, and the aspect ratio of the protuberances is 1.

The prominence and depression of the protuberances is as follows.

Namely. 'a' is 200 μm, 'b' is 200 μm, 'c' is 400 μm, "t" is 180 μm, and the aspect ratio is 1. Also, it is preferable for 'pt', the thickness of polymer electrolyte membrane to be 50 μm.

TABLE 3

|  | The width Of the Protuberances (a) | The height Of the Protuberances (b) | The height Of the Groove (c) | The Width (t') | The width Of Total Electrode (t' + b) | The width of the polymer electrolyte membrane (pt) |
| --- | --- | --- | --- | --- | --- | --- |
| FIG. 5a | 100 μm | 100 μm | 200 μm | 90 μm | 190 μm | 50 μm |
| FIG. 5b | 100 μm | 200 μm | 200 μm | 180 μm | 380 μm | 50 μm |
| FIG. 5c | 100 μm | 300 μm | 200 μm | 80 μm | 380 μm | 50 μm |
| FIG. 5d | 200 μm | 200 μm | 400 μm | 180 μm | 380 μm | 100 μm |

Table 3 represents the width and height of the protuberances, the width of the groove, the width, the width of total electrode and the width of the polymer electrolyte membrane according to figure number.

The upper electrode and the lower electrode between which the polymer electrolyte membrane is interposed engage each other and are put together.

In the membrane electrode assembly, preferably the aspect ratio is 0.01~6, and even more preferable for the aspect ratio to be 1~3.

Also, preferably the width of the protuberances is about 100~200 μm, for the width of the groove to be 200~400 μm, and the thickness of the polymer electrolyte membrane to be 50~100 μm.

At the present technical level, it is preferable for the aspect ratio of the protuberances which can be manufactured to be about 0.5~3, for the thickness of the polymer electrolyte membrane to be about 10~200 μm, and for the width of the protuberances to be 50~500 μm.

However, it should be understood that the present invention should not be limited to the mentioned embodiments, for example, the size of the protuberances, the electrolyte, and aspect ratio. Also, the characteristic of the present invention is the membrane electrode assembly including the protuberances and method for producing the same, FIG. 6 represents a production process of membrane-electrode-assembly in accordance with one preferred embodiment of the present invention.

Referring to FIG. 6, the production process of the membrane electrode assembly including the protuberances is represented. The production process of the membrane electrode assembly according to the present invention is as follows.

The upper electrode and the lower electrode are manufactured to include the protuberances in the step 605. The catalyst layer is formed on the electrode including the protuberances in the step 610.

Therefore, the polymer electrolyte membrane is interposed between the upper electrode and the lower electrode in the step 615. Hereby, there are two methods for interposing the polymer electrolyte membrane.

One is to insert a solid polymer electrolyte membrane between electrodes, while the other is to spray and coat the polymer electrolytic solution on the upper electrode and the lower electrode.

Two electrodes are aligned to engage each other, and hot-pressed in the step 620.

Hereinafter, (1) the protuberances forming process, (2) catalyst layer forming process, and (3) aligning and hot pressing process will be explained in detail.

(1) The Protuberances Forming Process

To manufacture the electrodes including the protuberance, a porous carbon paper(for example TGPH-60, thickness: 190 μm, TORAY Co.) is cut in regular size using a cutter.

The carbon paper is washed in a washing machine for 10 minutes using de-ionized water and dehydrated by drying in a drying machine for 20 minutes at 150° C. Therefore, the dried carbon paper is preheated at 120° C. and coated by dry film (for example DFR 405) of which the thickness is 50 μm.

In a laminating process according to one of the preferred embodiments of the present invention, preferably the temperature of the upper roller is about 125° C., the temperature of the lower roller is about 120° C., the press of the roller is about 40 psi, and the speed of rolling is about 0.4 cm/sec.

Also, according to another of the preferred embodiments of the present invention, preferably the temperature of the upper roller is about 55° C., the temperature of the lower roller is about 60° C., the press of the roller is about 40 psi, and the speed of rolling is about 2 mm/sec.

The carbon paper is exposed for 6~8 seconds at an energy density of about 200 mJ/cm$^2$ in a mask aligner using photo mask or film mask on which the shape of the protuberances is patterned.

Thereafter, the carbon paper is developed by spraying a developing solution (1–3% $Na_2CO_3$ solution) through a nozzle for 42 seconds in a developer.

The developing condition of the developer is as follows. Preferably the temperature of the developing solution is about 30° C., the spraying pressure about 40 psi, and the moving speed of the nozzle about 0.4 cm/sec. After developing in the way mentioned above, preferably the carbon paper is baked in an oven for about 2 minutes at about 100° C.

After the photolithography process, the carbon paper is etched to about 100 μm deep. The processing condition of etching by using equipment like a sandblaster is as follows. Preferably the moving speed of a substrate is about 45 mm/min, the speed of a nozzle 15 mm/min, the spouting pressure about 2.5 kg/cm$^2$, the interval between the substrate and the nozzle about 60 mm, and SiC is used as an abrasive.

The process to remove dry film attached to carbon paper etched is as follows. It is preferable to remove dry film by soaking the carbon paper in acetone solution, and to wash the carbon paper with de-ionized water for about 10 minutes in the washing machine.

Therefore, it is preferable to dehydrate by drying the carbon paper in a drying machine for 20 minutes at 150° C.

The electrode including the protuberances may be produced using a press processing.

The pattern of the protuberances formed on the electrode is designed by considering the size of the protuberances for two electrodes(usual thickness 190~500 μm) between which the polymer electrolyte membrane is interposed, to engage each to the other and be put together exactly.

Considering the total thickness of the electrode, it is preferable for the size of the protuberances formed on the electrodes to be in a range of hundreds of micrometers (100 μm×100 μm, 100 μm×200 μm, 100 μm×300 μm and 200 μm×200 μm).

In one method for forming the various protuberances on a porous carbon paper, that is, the method of etching one side of carbon paper to the predetermined depth, is described above.

The other method for forming the various protuberances on porous carbon paper, that is, the method for producing a two-fold membrane electrode assembly (a membrane electrode assembly including the electrodes with a double layer), is as follows. The holes corresponding to the protuberances shape are made on one carbon paper, and the other carbon paper is attached to the one carbon paper which includes the holes.

This method is advantageous as follows. The etching process of carbon paper and handling of carbon paper may be easy, may reduce inferiority, and mass-produced.

Hereinafter, the method of producing the two-fold membrane electrode assembly will be explained in detail. First, the porous carbon paper is cut into a predetermined size. The carbon paper is washed using a de-ionized water for about 10 minutes in a washing machine and dehydrated by drying in a drying machine for 20 minutes at 150° C.

The dried carbon paper is preheated at 120° C. and then coated by dry film with a thickness of 50 μm (for example DFR 405).

In the laminating process according to one of the preferred embodiments of the present invention, it is preferable for the temperature of the upper roller to be about 125° C., for the temperature of the lower roller to be about 120° C., for the press of the roller to be about 40 psi, and for the rolling speed to be about 0.4 cm/sec.

Also, according to another of the preferred embodiments of the present invention, preferably the temperature of the upper roller is about 55° C., the temperature of the lower roller is about 60° C., the press of the roller is about 40 psi, and the speed of rolling is about 2 mm/sec.

Also the carbon paper is exposed for 6~8 seconds at an energy density of about 200 mJ/cm$^2$ in a mask aligner using photo mask or film mask in which the shape of the protuberances is patterned.

Thereafter, the carbon paper is developed by spraying a developing solution (1–3% $Na_2CO_3$ solution) through a nozzle for 42 seconds in a developer.

The developing condition of the developer is as follows. It is preferable for the temperature to be about 30° C., for the pressure of spraying to be 40 psi, and for the moving speed of the nozzle to be 0.4 cm/sec. After developing as described above, it is preferable for the carbon paper to be baked in an oven for about 2 minutes at about 100° C.

After completing the photolithography process mentioned above, the carbon paper is etched until a hole is made in the carbon paper. The processing condition of etching by using equipment like a sandblaster is as follows. It is preferable for the moving speed of a substrate to be about 45 mm/min, for the speed of a nozzle to be about 15 mm/min, for the spouting pressure to be about 2.5 kg/cm$^2$, for the interval between the a substrate and a nozzle to be about 60 mm, and to use SiC as a abrasive.

After the etching process, the process of removing a dry film attached to the etched carbon paper is as follows. It is preferable to remove dry film by soaking the carbon paper in acetone solution, wash the carbon paper with de-ionized water for about 10 minutes in a washing machine, and dehydrate the carbon paper to dry for about 20 minutes at the temperature of about 150° C. in a drier.

The electrodes of double layer can be made by attaching flat electrode of about 190 μm thickness to the electrode in which the holes corresponding to the protuberances are made.

Figure 7A:
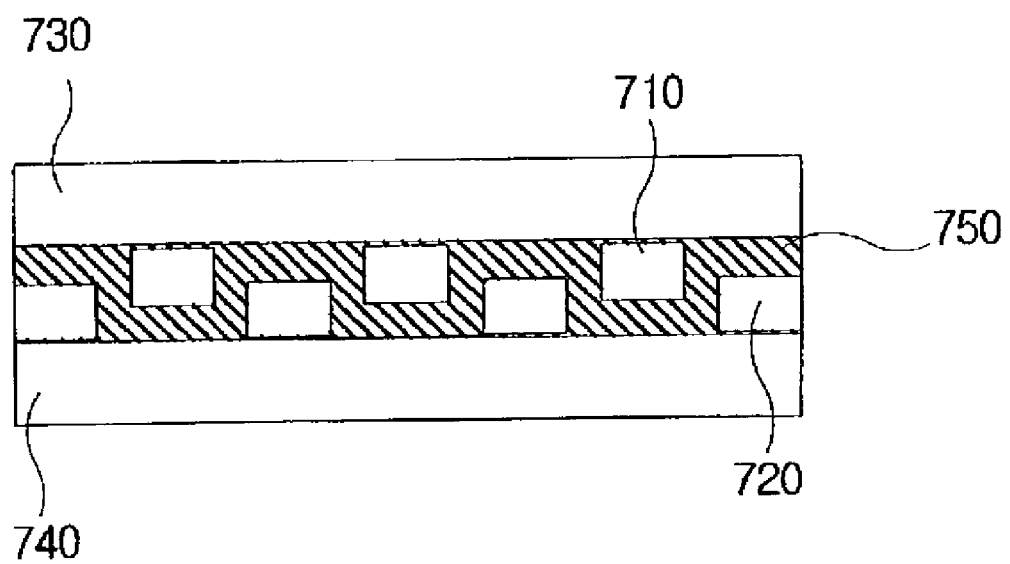
FIG. 7a is a sectional view of two-fold membrane electrode assembly in accordance with one preferred embodiment of the present invention.

FIG. 7a is a sectional view of a two-fold membrane electrode assembly in accordance with one preferred embodiment of the present invention.

Referring to FIG. 7a, the schematic view section shows that flat electrodes are attached to the upper electrode including the protuberances 710 and the lower electrode including holes 720, such that the polymer electrolyte membrane is interposed between the electrodes in double layers.

Figure 7B:
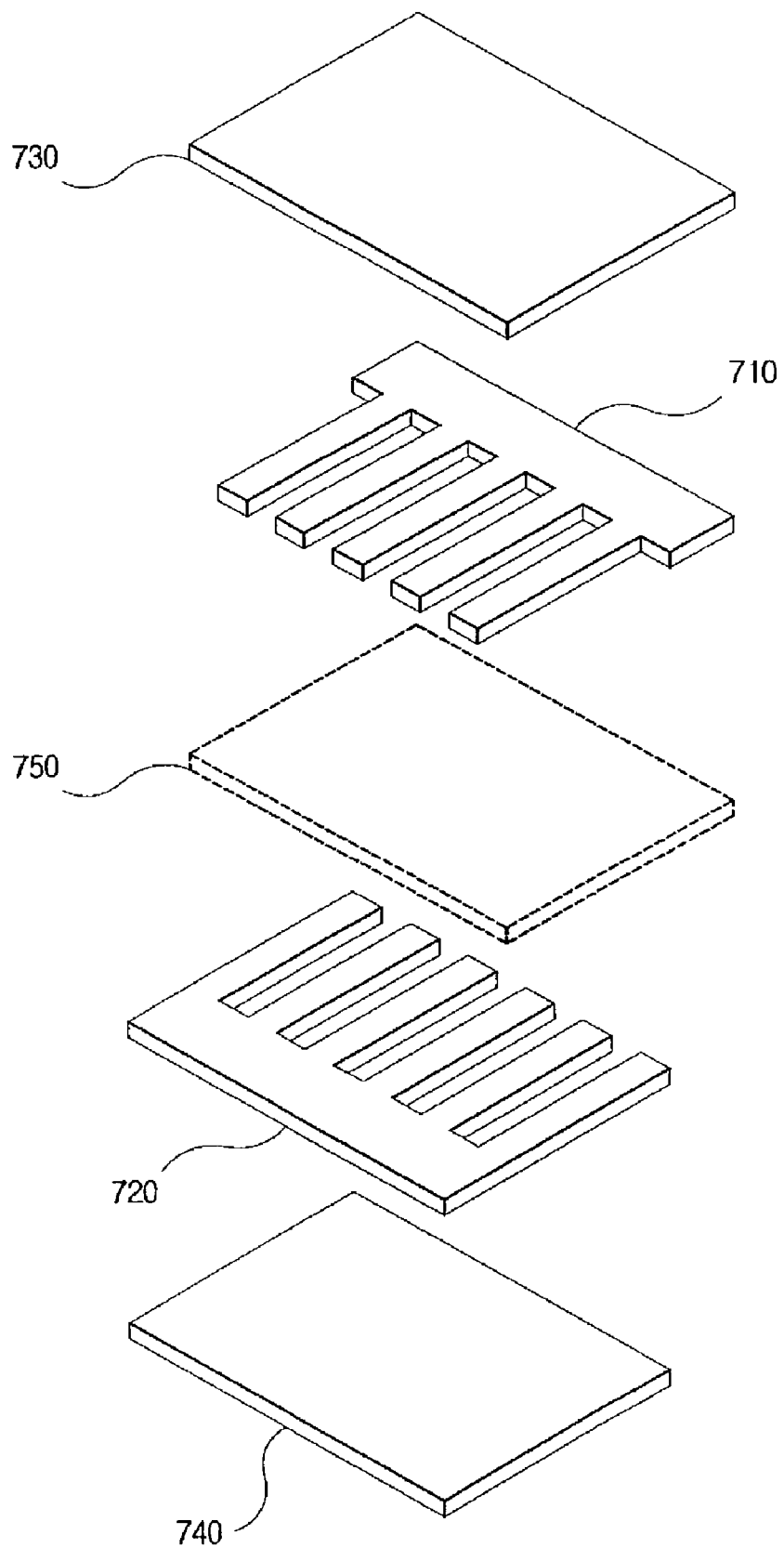
FIG. 7b represents the producing method of two-fold membrane electrode assembly in accordance with one preferred embodiment of the present invention.

FIG. 7b represents the producing method of a two-fold membrane electrode assembly in accordance with one preferred embodiment of the present invention.

Referring to FIG. 7b, the schematic production process of the two-fold membrane electrode assembly in FIG. 7a is represented.

The two-fold membrane electrode assembly comprises a flat electrode 730, 740, the electrode in which holes are formed 710, 720, and the polymer electrolyte membrane interposed between the electrodes 750.

According to another preferred embodiment, the production method of the two-fold membrane electrode assembly in FIG. 7a is as follows. The electrodes are manufactured through a press processing by using a cutter that can make the shape represented in FIG. 7a.

(2)Catalyst Layer Forming Process.

After the protuberances forming process, the electrodes go through a hydrophobic coating process and a catalyst layer process. The supporting bodies (for example, carbon paper of carbon cloth) which constitute the electrode can diffuse the reaction gas in a catalyst layer and support the catalyst layer.

Also, the supporting bodies function as the current collector to move the current generated in catalyst layer to a separator and as a passage to flow the generated water out of the catalyst layer. Therefore, the supporting bodies are hydrophobic-coated with Teflon and so on to prevent flooding by water.

The hydrophobic-coating process is as follows. After the carbon paper or the carbon cloth cut into the predetermined size is soaked in an aqueous solution which is diluted to 20 wt % with FEP120 (copolymer of Tetrafluoroethylene and hexafluoroethylene, Dupont Co.) for 20~30 seconds, it is dried in the air for one day and is fire-heated at a temperature of 375° C. for 20 minutes.

It is preferable for Teflon as a bonding agent to be added in a catalyst slurry to form the catalyst layer on the supporting bodies.

Teflon can function as a bonding agent and form the three-phase boundary to increase hydrophobic effect of catalyst layer. That is to say, a hydrophobic gas hole that is coated with Teflon can be a passage of reaction gas. Also a hydrophilic gas hole which is not coated with Teflon can be filled with an electrolyte, therefore accelerating the forming of three-phase boundary on catalyst layer.

The method for producing a catalyst slurry in which Teflon is added is as follows. Firstly, the supported Pt/C is suspended in THF (Tetrahydrofuran) and then agitated for 30 minutes with supersonic waves. Furthermore, the watery Teflon solution is added to the suspension solution which is agitated intensely. Finally, the water in the suspension solution is removed by a centrifugal separator. It is preferable for the composition of Teflon to be 27 wt % after the slurry is dried and made with a heat treatment at 360° C.

The other method of increasing the efficiency of the catalyst layer is to immerse a liquid electrolyte (for example, Nafion Ionomer) in catalyst layer. In a real reaction, the speed of a hydrogen ion to move to Pt catalyst is higher in Ionomer than in water.

One preferred embodiment to immerse Ionomer in a catalyst layer is as follows. After a catalyst layer is formed, a Nafion Ionomer solution is spread thinly at less than 10 μm. If the Nafion Ionomer is immersed too deeply, gas diffusion in the catalyst layer may be disturbed.

The other preferred embodiment to immerse Ionomer in catalyst layer is as follows. When a catalyst slurry is made, Nafion Ionomer solution is added. According to the other preferred embodiment, it is preferred to mix Teflon suspension solution with Nafion Ionomer solution and to agitate for 15 minutes. A supported Pt/C catalyst layer is added to this solution. It is preferable for the composition of Teflon to be 15 wt % and for the composition of Ionomer to be 5 wt %.

Consequently, a forming process having a three-phase boundary is accelerated by linking Pt catalyst and Ionomer structurally That is, the effective reaction area of the catalyst can be enlarged and the movement of hydrogen ion can be faster.

The method for forming the catalyst on polymer electrolyte membrane directly is not effective because the supporting bodies according to the present invention have a plurality of the protuberances. Therefore, it is preferable to form a catalyst layer on the electrodes.

The supported Pt/C catalyst is mixed with a dispersion agent, a bonding agent, and Nafion Ionomer solution, and then the catalyst slurry is made.

The methods for coating with a catalyst slurry on the supporting bodies are brushing, rolling, spraying, screen-printing and so on. In the present invention because the electrode has a plurality of protuberances, it is more preferable to use spraying which has good productivity and is not influenced by the shape of substrate.

When coating with a catalyst slurry, the method for increasing the homogeneity of coating is as follows. The electrodes are attached to a rotating device. It is preferable to coat the electrodes while rotating the rotating device at a low speed clockwise and counterclockwise.

The homogeneity and the thickness of a coating layer depends on the shape of nozzle, a spraying quantity of slurry solution, a spraying angle, the distance between nozzle and electrode, a rotating velocity and so on.

If PTFE is added, it is preferable to dry the coating layer with a temperature of 20° C.~150° C. in a nitrogen atmosphere and make a heat treatment at 360° C. And, if Nafion Ionomer is added, it is preferable to make a heat treatment with a temperature of 130~195° C.

After catalyst is coated, a pre-process is needed to manufacture the membrane electrode assembly. Generally, Nafion membrane is provided in the state of natrium ion (Na+) with an objective for safekeeping. Therefore, to transform natrium ion to $SO_3H^+$ that has a hydrogen ion ($H^+$), it is necessary to make a pre-process of Nafion as follows.

First, the polymer electrolyte membrane having a predetermined size is immersed in boiling water for about two hours and then boiled in hydrogen peroxide for about four hours. Thereafter, extant inorganic compounds are removed by washing with water.

Second, the polymer electrolyte membrane is immersed in boiling water for about two hours again. After the polymer electrolyte membrane is boiled in 1M sulfuric acid for two hours, extant inorganic compounds can be removed by being washed with water.

The extant sulfuric acid can be removed by soaking the polymer electrolyte membrane in boiling water for two hours. To store the polymer electrolyte membrane for a long period, it is preferable to keep it in an airtight location and then boil it for 30 minutes before using it.

The polymer electrolyte membrane can be formed using a conventional for sale polymer electrolyte membrane, for example, Nafion 117, 115, 112 and so on. However it is preferable to form the polymer electrolyte membrane by spraying with the coating method mentioned above.

(3) Aligning and Hot Pressing Process.

The aligning step that two electrodes between which the polymer electrolyte membrane is interposed are aligned precisely and the hot pressing step is the last step of manufacturing the membrane electrode assembly.

Figure 8:
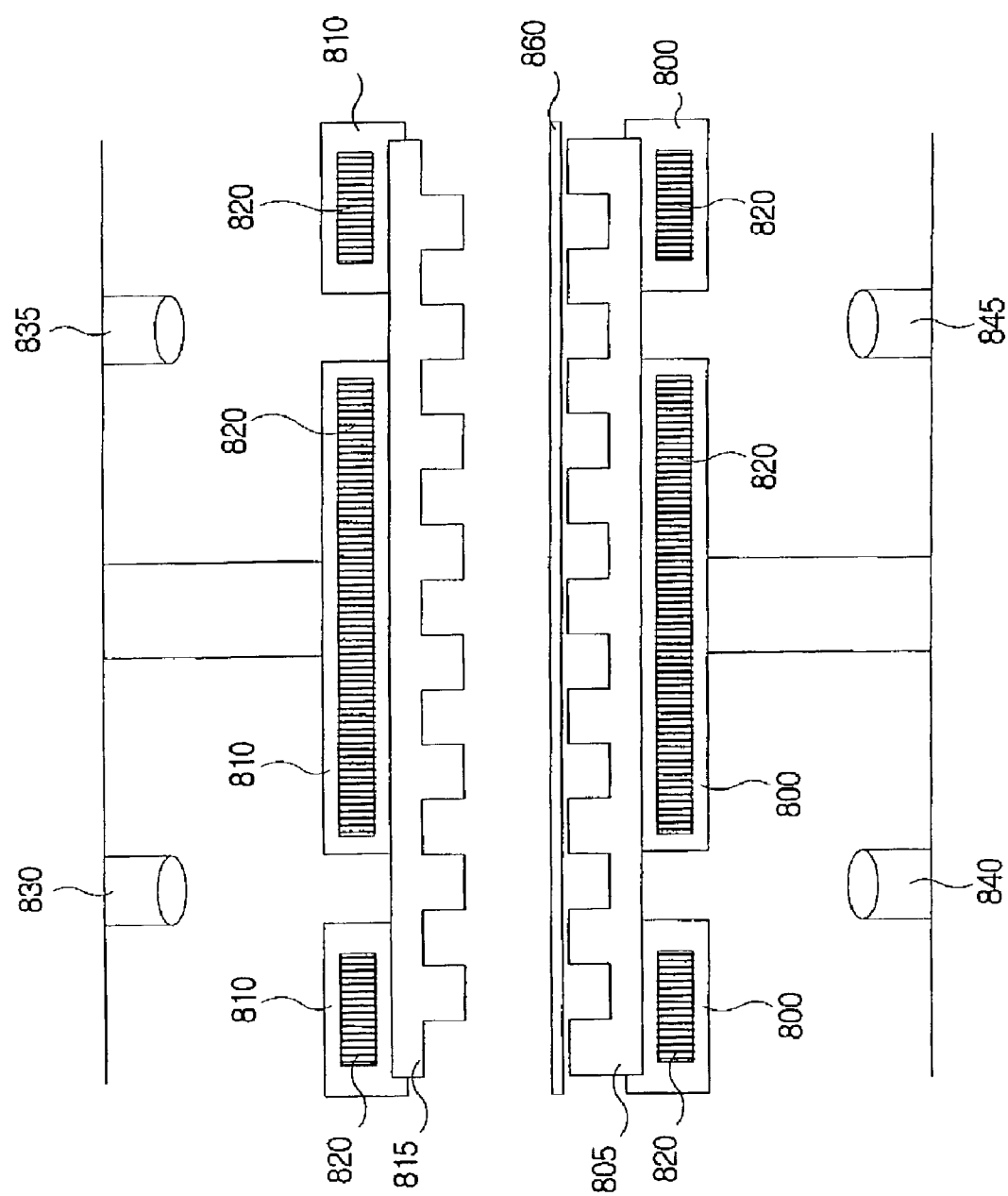
FIG. 8 represents a method for aligning the membrane electrode assembly by both sides being aligned in accordance with one preferred embodiment of the present invention.

FIG. 8 represents a method for aligning the membrane electrode assembly by a double-sided alignment method in accordance with one preferred embodiment of the present invention.

Referring to FIG. 8, there are holders which have the function to separate the upper electrode 815 and the lower electrode in the air.

A lower holder 800 has the micro positioning function to move minutely in X direction and Y direction. An upper holder can move in z direction and press at a predetermined pressure.

Also, the upper holder and the lower holder include a heat source that can heat at a predetermined temperature, and a microscope (830, 835, 840, 845) is installed to align the upper electrode and the lower electrode.

It is preferable for the aligning step to be performed in an airtight chamber in order to maintain regular humidity.

The aligning method according to one preferred embodiment of the present invention uses the align marks generated by exposure in the upper electrode and the lower electrode.

The method for aligning by a double-sided alignment is as follows. After the polymer electrolyte membrane is put on the lower electrode, the upper electrode and the lower electrode are aligned for the alignment mark to accord perfectly.

After the alignment, the condition of the upper holder moving in z direction is as follows. Under the conditions that pressure is 200~300bar, humidity is 70–80%, and temperature of heat source of holders is 90° C.~150° C., preferably hot-pressing should occur for 1–5 minutes.

As mentioned above the aligning and hot-pressing is performed simultaneously, while maintaining those preferred conditions including temperature, humidity, pressure and so on, However, it is possible for the aligning and the hot-pressing to be performed separately in two steps for mass production.

The first step is as follows. The upper electrode and the lower electrode are put on the upper holder and the lower holder, and the polymer electrolyte membrane is put on the lower electrode. When the upper holder moves in Z direction, it is preferable to manufacture a preliminary membrane electrode assembly, and pressing at a pressure of 10~50 bar.

The second step is as follows. Firstly, the preliminary membrane electrode assembly is put in a hot press device. And, under conditions that pressure is 200~300 bar, humidity is 70–80%, and temperature of heat source of holders is 100° C.~150° C., preferably a hot-pressing occurs for 1–5 minutes.

Figure 9A:
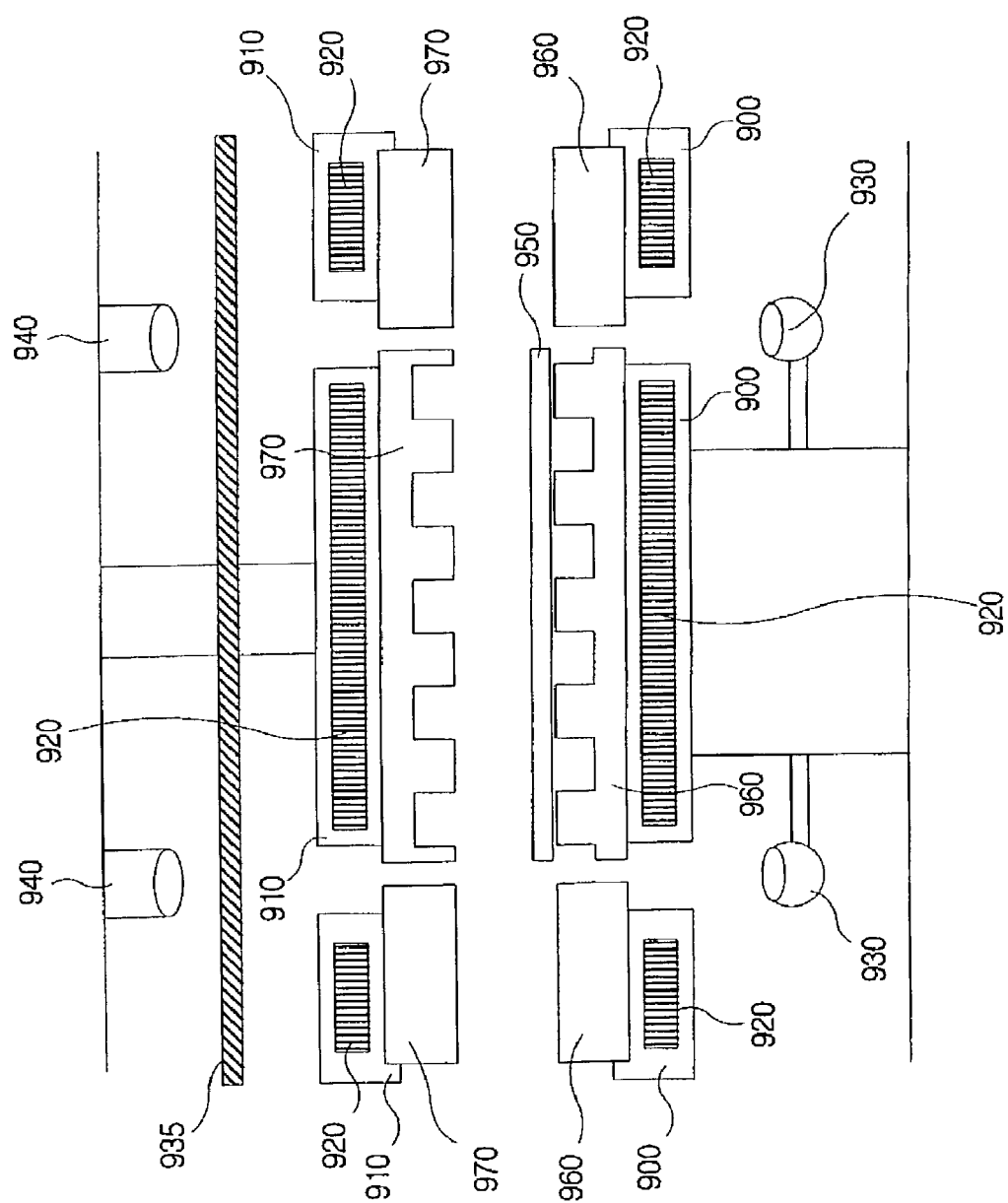
FIG. 9a represents a method for aligning the membrane electrode assembly by using the shape of a light source in accordance with one preferred embodiment of the present invention.

FIG. 9*a* represents a method for aligning membrane electrode assembly by using a shape of light source in accordance with one preferred embodiment of the present invention.

The aligning method using the shape of light source 930 is as follows. Firstly, an aligning hole is formed in the upper part, the lower electrode and the upper electrode are fixed in the upper holder and the lower holder, and the light source can be set up anywhere in the upper part or lower part in a double-sided aligner.

The aligning method can be performed by perceiving the shape of the light source on a shape perception plate 935 that passes through the aligning hole.

Referring to FIG. 9*a*, the holders function to separate the upper electrode 815 and the lower electrode in the air.

A lower holder 900 has the micro positioning function to move minutely in X direction and Y direction. An upper holder 910 can move in z direction and press at a predetermined pressure. Further, the upper holder and the lower holder include the heat source 920 that can heat at a predetermined temperature, Also, the shape perception plate 935 is set up anywhere in the upper part or lower part in a doubled-sided aligner to align the upper electrode and the lower electrode. Perceiving the shape can be performed with a microscope 940 through which the shape can be observed or image sensor. Preferably the aligning step is performed in an airtight chamber in order to maintain regular humidity.

Figure 9B:
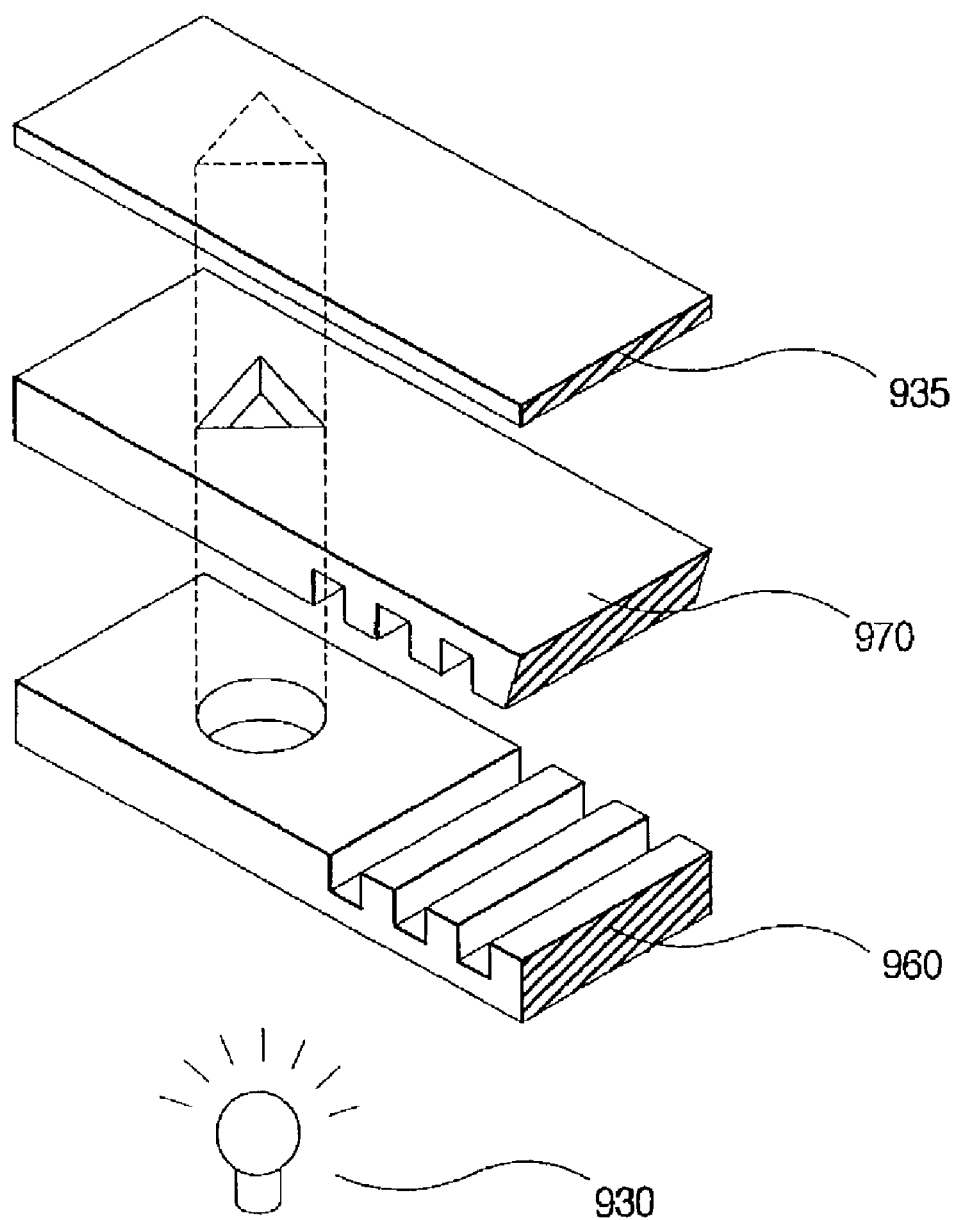
FIG. 9b represents in detail a method for aligning the membrane electrode assembly by using the shape of a light source in accordance with one preferred embodiment of the present invention.

FIG. 9b represents in detail a method for aligning the membrane electrode assembly by using a shape of light source in accordance with one preferred embodiment of the present invention.

The aligning method using the shape of light source is as follows The present invention will be explained with reference to the light source that is set up in the lower part.

A circular aligning hole is formed in the lower electrode 960 and a regular triangular aligning hole that is inscribed within the circular hole of the lower electrode is formed in the upper electrode. Preferably the distance between the upper electrode and the lower electrode is 10–50 μm.

Referring FIG. 9a, the electrodes are aligned for the shape of a regular triangle to be formed on the shape perception plate 935.

Figure 10:
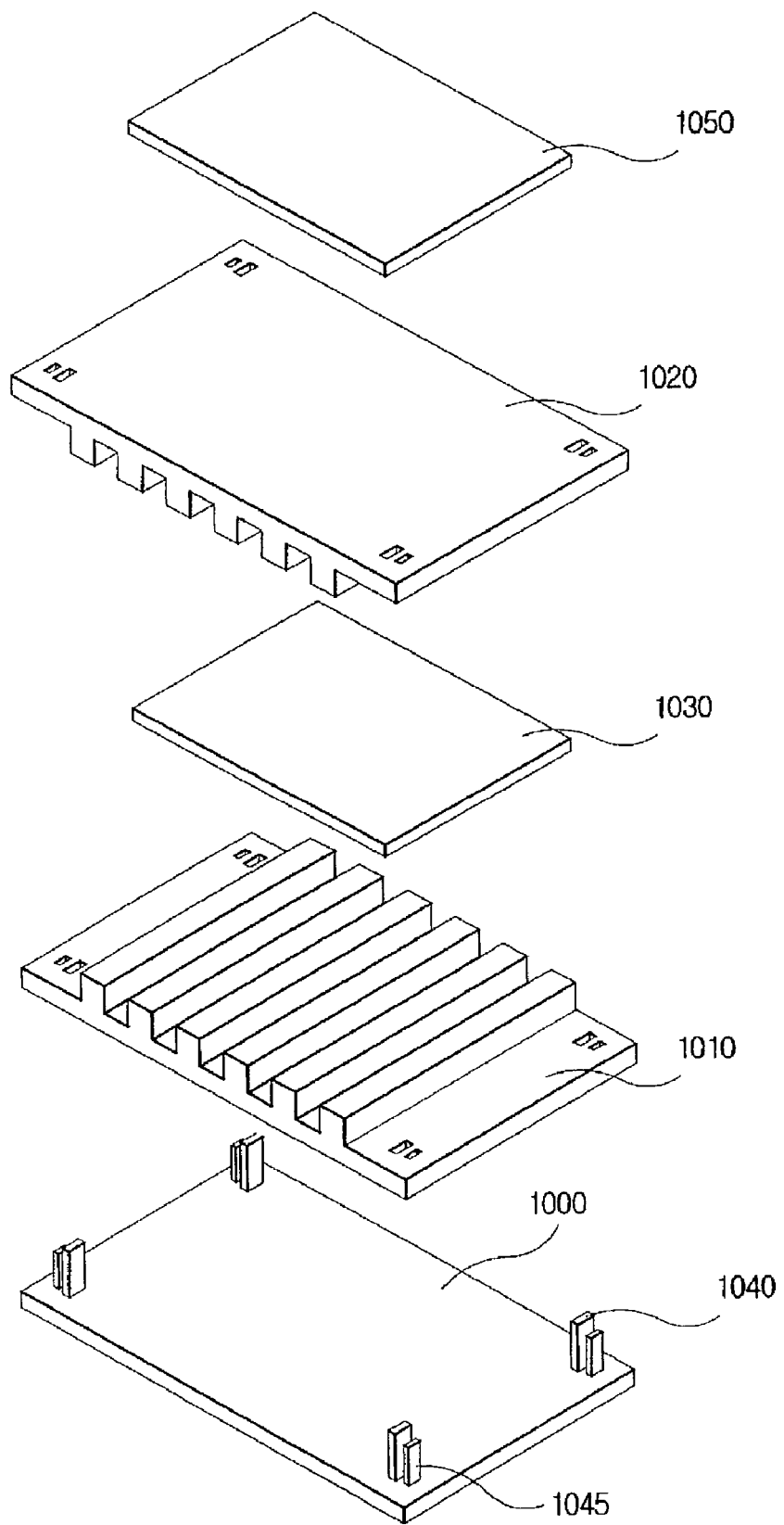
FIG. 10 represents a method for aligning the membrane electrode assembly by using an aligning member in accordance with one preferred embodiment of the present invention.

FIG. 10 represents a method for aligning the membrane electrode assembly by using aligning member in accordance with one preferred embodiment of the present invention.

Referring to FIG. 10, the aligning holes are formed in the electrodes, and the lower plate includes an aligning member and heat source. The aligning is performed when the aligning member formed on the lower plate 1000 is inserted into the aligning hole formed in the lower electrode 1010 and the upper electrode 1020.

The aligning member includes the first aligning member 1040 of which the side length is about 1–3 mm and the height is about 5–10 cm, and the second aligning member 1045 of which the side length is about 0.5–1 mm and the height is about 2–4 cm.

Firstly, the upper electrode is set up on the lower plate. The first aligning member is inserted into the aligning hole corresponding to the first aligning member, and the second aligning member is inserted into the aligning hole corresponding to the second aligning member.

Hereafter, the polymer electrolyte membrane is set up on the lower electrode, and the upper electrode is inserted like the lower electrode.

Therefore, the upper electrode is pressed by the upper plate, which includes a heat source with a pressure of about 200~300 bar and a humidity of about 70–80%.

Preferably the electrodes are pressed using the heat source which is included in the upper plate and the lower plate having a temperature of about 100° C.~150° C. for 1–5 minutes.

Figure 11:
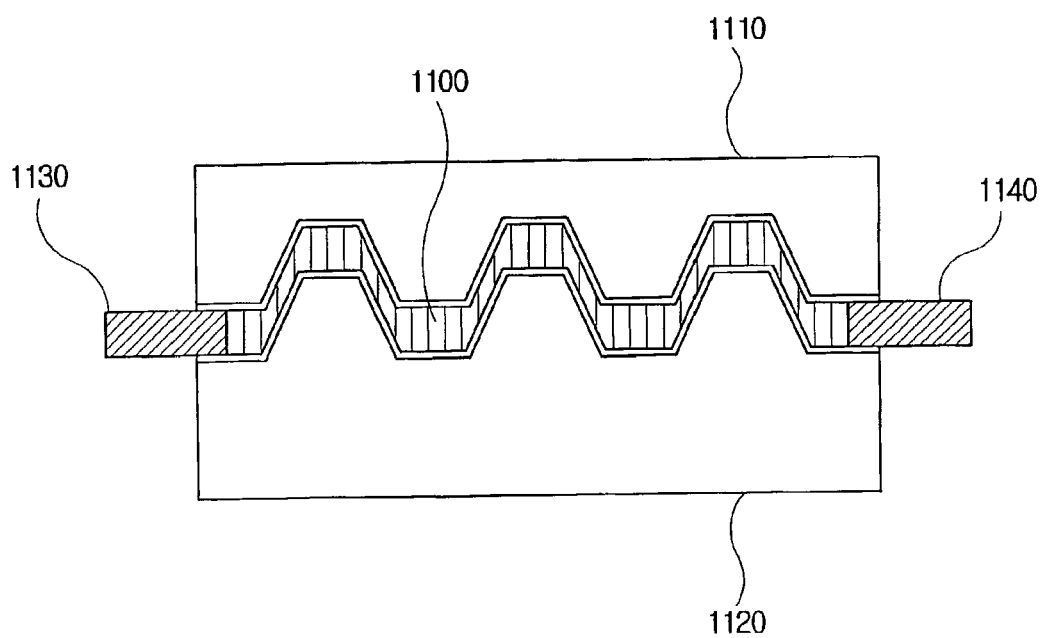
FIG. 11 represents the spacer that is used to control the thickness of polymer electrolyte membrane in accordance with one preferred embodiment of the present invention.

Of course, the aligning and the hot-pressing mentioned above can be used for spraying the polymer electrolyte solution (for example 25% Nafion solution) as well as the polymer electrolyte membrane FIG. 11 represents a spacer that is used to control the thickness of polymer electrolyte membrane in accordance with one preferred embodiment of the present invention.

During the hot-pressing process the spacer, of which thickness is decades of micrometers (20–80 μm) and the PTFE series, is inserted between the electrodes 1110, 1120 to control the thickness of the polymer electrolyte membrane easily.

Also, the spacer can be set up in the edge of the electrodes or in a predetermined position of the electrodes. The membrane electrode assembly is manufactured through the process mentioned above.

A fuel cell stack can be manufactured using the membrane electrode assembly. A separator called a bipolar plate is used for linking the unit cell included in the fuel cells. Also, the separator has the function to provide oxygen and fuel with anode and cathode.

A flow field for supplying oxygen is formed on one side of the separator, and a flow field for supplying fuel is formed on the other side of the separator. Also, the separator has the function to move electrons generated in anode to cathode and to remove the water generated by an electric chemical reaction.

A flow field according to the present invention is formed on both sides of the separator, and the cooling plate can be included in the separator. Therefore, the heated water generated by the electric chemical reaction is removed effectively.

Hereafter, the separator lacking a cooling plate will be called a flow field plate.

Because of the structure mentioned above, fuel (reaction gas or gas) and cooling water can be provided and discharged upon being separated.

Figure 12:
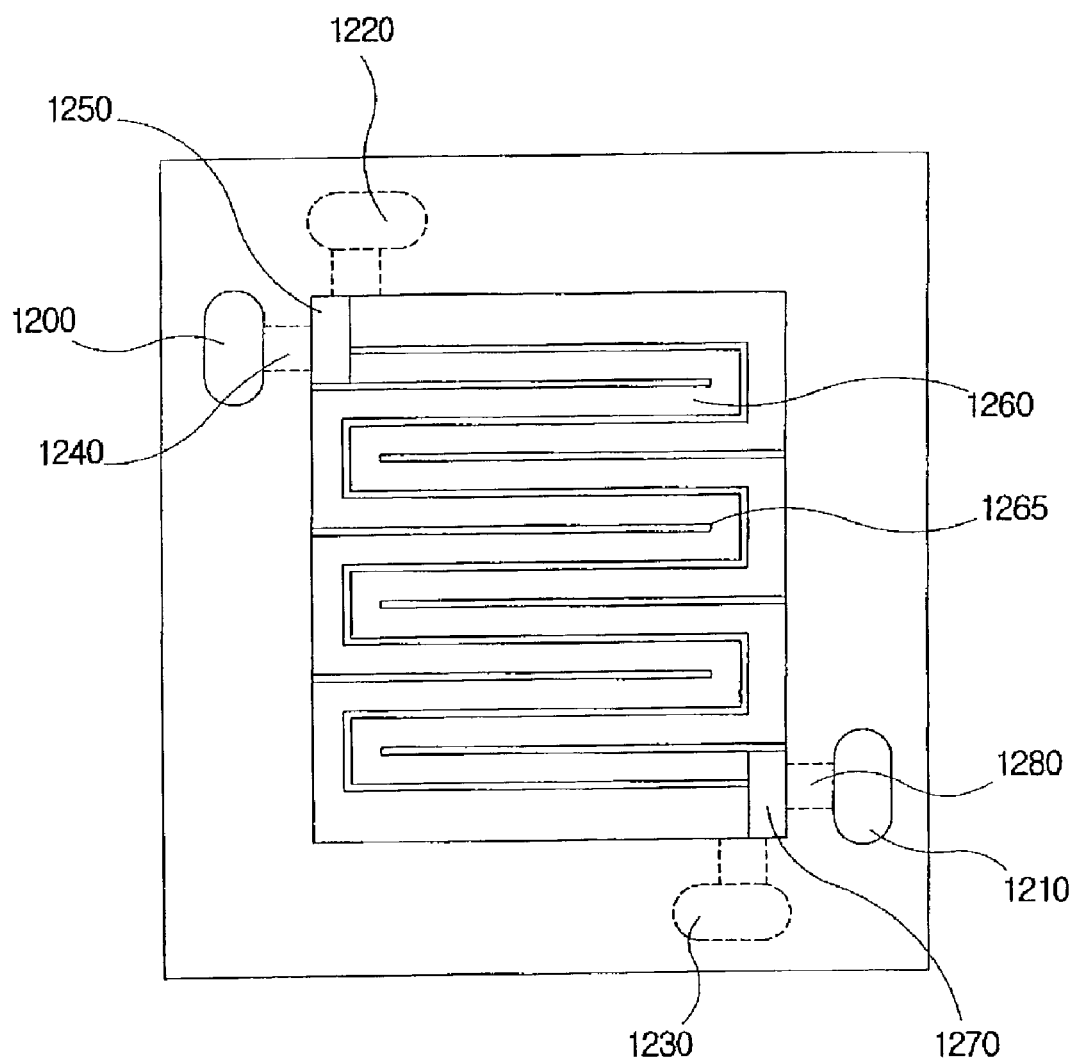
FIG. 12 represents a separator in accordance with another preferred embodiment of the present invention in accordance with one embodiment of the present invention.

FIG. 12 represents a separator in accordance with one preferred embodiment of the present invention. For the convenience of understanding the present invention, the cooling plate is omitted from the separator.

Referring to FIG. 12, the present invention will be explained with reference to the side on which the flow field providing fuel is formed. The separator comprises a fuel supplying hole 1200, a fuel exhausting hole 1210, a gas supplying hole 1220, a gas exhausting hole 1230, a supplying induction passage 1240, a supplying hole 1250, a flow field 1260, a flow field partition 1265, an exhausting hole 1270, an exhausting induction passage 1280 and so on.

The fuel-supplying hole 1200 supplies the membrane electrode assembly with hydrogen and the fuel gas of PEFC, and the fuel-exhausting hole 1210 exhausts the exhaust fumes that did not react.

The gas-supplying hole 1220 located in the reverse side of the separator can supply gas like oxygen, and the gas-exhausting hole 1230 can exhaust the gas which is generated while operating the fuel cell.

The supplying induction passage 1240 directs flow of the fuel in the fuel supplying hole 1200 to the supplying hole 1250.

Further, the flow field 1260 functions as a guide to direct movement of the fuel to react with the membrane electrode assembly and also direct movement of $H_2O$ generated by oxidation-reduction reaction. The flow field partition 1265 maintains the flow field 1260 and helps a gas or a liquid to move in the flow field effectively.

Figure 13:
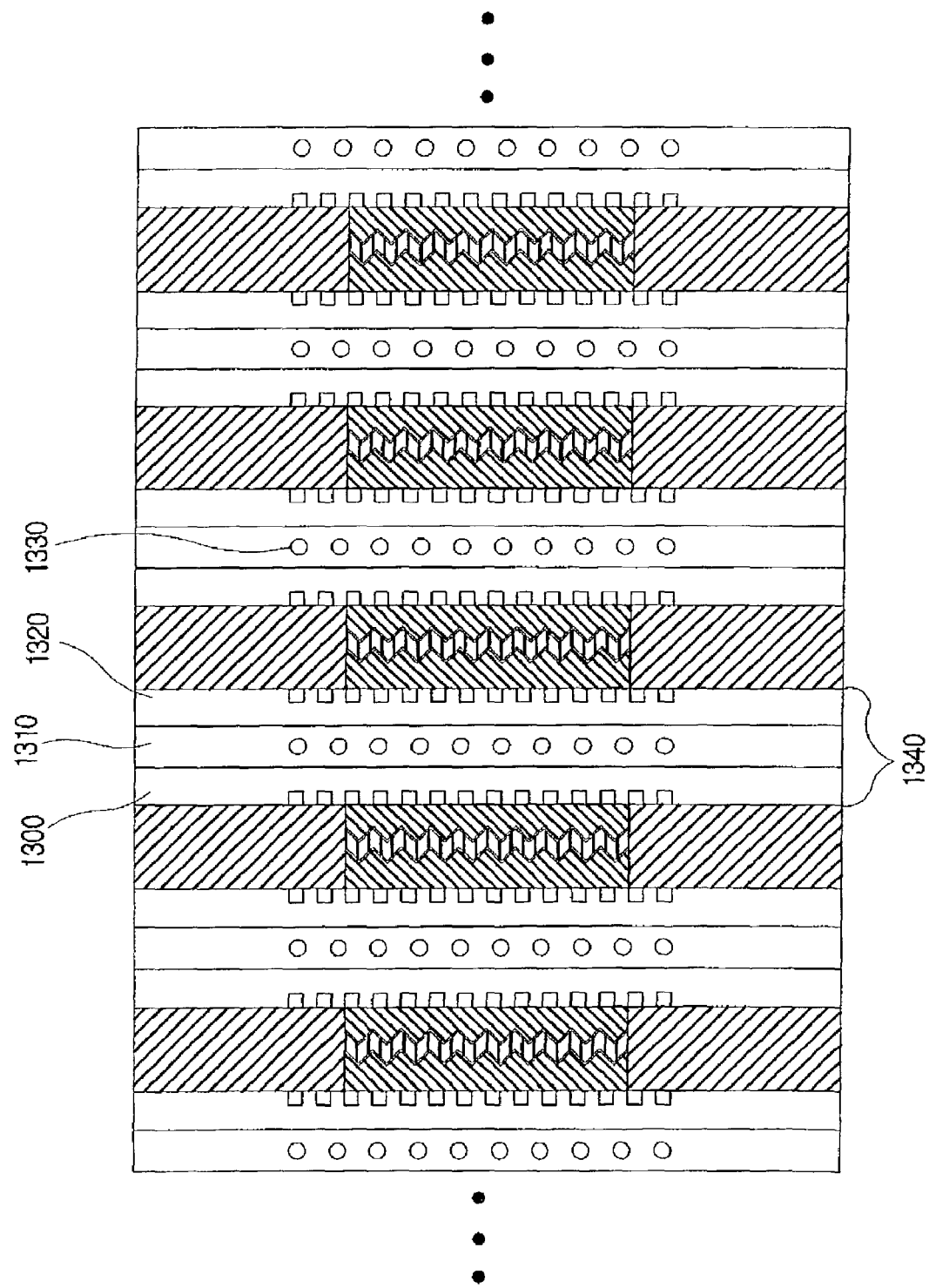
FIG. 13 represents the structure of a stack where unit cells are piled in accordance with one embodiment of the present invention.

FIG. 13 represents the structure of a stack where unit cells are piled in accordance with one embodiment of the present invention.

The fuel cell stack is comprised of tens or hundreds of unit cells. Generally the last part of a stack is pressed to lessen the contact resistance.

A fuel cell system comprises a fuel reformer part needed while using the fuel of hydrogen series, a stack part generating power by electric chemical reaction, a power transformer transforming direct current to alternating current and a control part and so on.

For high efficiency, high consumer confidence, and low price, it is necessary to construct a fuel cell system for all the parts to operate effectively. Above all, the performance of the stack part in which the electric chemical reaction is generated is the most important part. The stack part in which the membrane electrode assembly and the bipolar plate are piled in series may include the cooling plate.

The high performance of the stack can lead to a small-size stack and a low price stack. For high performance of the stack, it is important to use improved material for the separator and design the thickness of the flow field effectively to be thin and result in the fast flow of a fluid.

However, it is most important to improve the performance of membrane electrode assembly in which the electric chemical reaction occurs.

Improvement of power density of the membrane electrode assembly enables the membrane electrode assembly to generate more power in the same volume and also to be a smaller size with the same power.

Consequently, the present invention can reduce the cost of the stack which is associated with high cost in fuel cell system.

Referring to FIG. 13, unit cells are piled in the fuel cell stack. The flow field plates 1300, 1320 according to the present invention are formed in both sides of the separator 1340, and the cooling plate 1310 is interposed between the flow field plates, therefore the heat generated by electric chemical reaction can be removed effectively.

The channel to supply and exhaust a coolant can be formed on the cooling plate 1310 to remove or use the heat generated by electric chemical reaction.

Also, because of the structure mentioned above, the fuel and the cooling water can be supplied and exhausted separately. Of course, it is possible to make a stack with the cooling plate that is interposed between the omitted flow.

An outlet and an inlet of reaction gas, a circulation hole of coolant, the output terminal of a generated voltage and so on can be included in the basic structure of the stack.

To operate the fuel cell system, a fuel reformer, an air compressor, a handling device of heat and water, and a power transformer must be equipped and the explanation of the fuel cell system will be made by referring to FIG. 14.

The unit cells including the membrane electrode assembly according to the present invention are piled as a stack; therefore, the PEMC having desired capacity can be manufactured using the stack.

Figure 14:
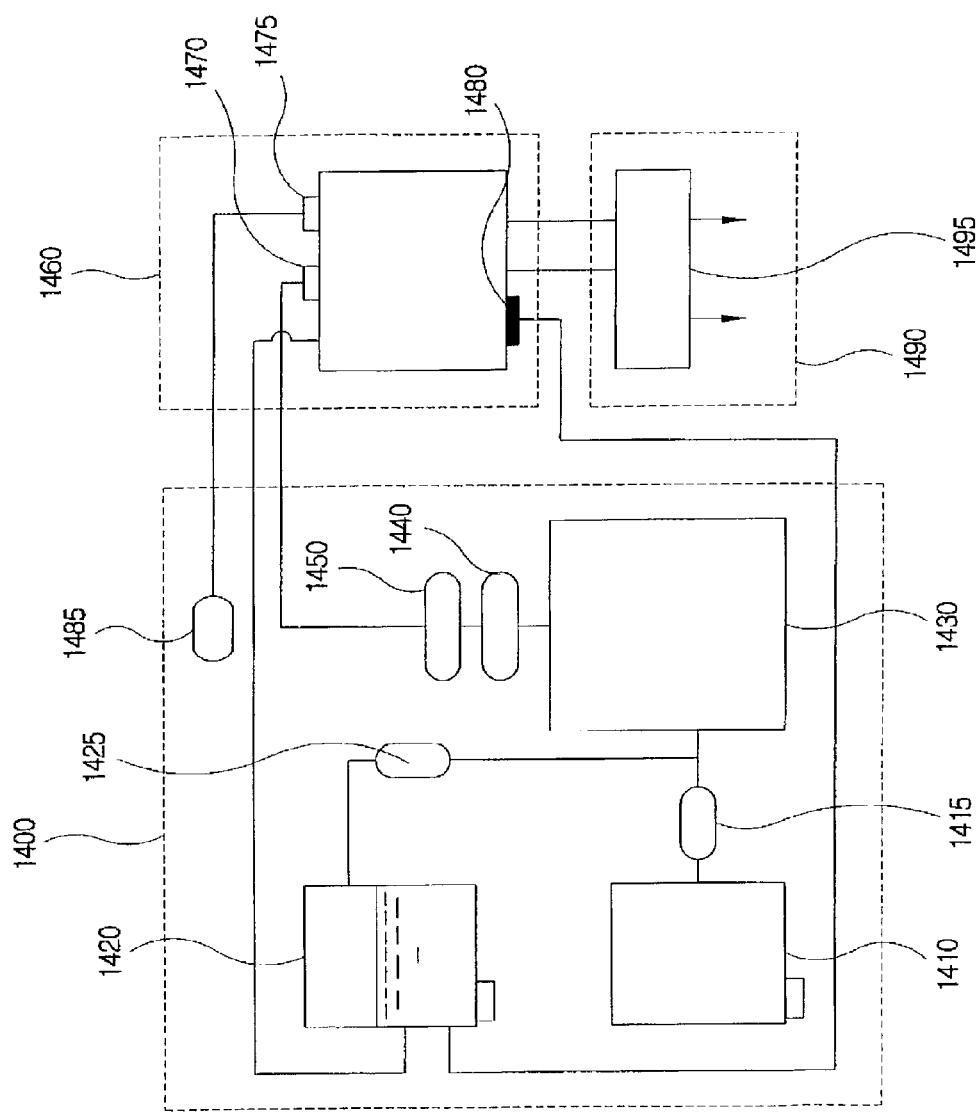
FIG. 14 represents schematic diagram of fuel cell system in accordance with still another preferred embodiment of the present invention.

FIG. 14 represents a schematic diagram of fuel cell system in accordance with one preferred embodiment of the present invention.

Referring to FIG. 14, the PEMC system that includes the membrane electrode assembly comprises:

a fuel supplying part 1400 which includes a natural gas cabinet 1410, a natural gas flux controller 1415, a water tank 1420, a steam generator 1425, a hydrogen reformer 1430, an impurities remover 1440, a CO remover 1450 and an air filter 1485; a fuel cell part 1460 which includes a fuel supplying hole 1470, a fuel cell part 1460 which includes air supplying hole 1475, a coolant circulating hole 1480; and a power controlling part 1400 which includes power controlling part 1490.

The fuel supplying part 1400 includes the natural gas cabinet 1410 and the natural gas flux controller 1415.

The hydrogen reformer 1430 can generate a reformed gas abundant in hydrogen. In the hydrogen reformer 1430, steam and natural gas generated by a water tank 1420 and a steam generator 1425 are reformed into a reformed gas abundant in hydrogen by a reforming catalyst and a steam reforming reaction.

The fuel supplying part 1400 includes the impurities remover 1440 coupled to the hydrogen reformer 1430 which removes the impurities in the natural gas, and the CO remover 1450 coupled to the impurities remover 1440.

A metal, for example ruthenium, rhodium, or nickel which is immersed in a carrier is used as a reforming catalyst. As the carrier, zirconium dioxide, alumina, silica gel, activated alumina, titanium dioxide and active carbon are used. Also, the CO remover 1450 decreases the catalyst poison to platinum catalyst.

The fuel cell part 1460(PEFC) includes the fuel supplying hole which supplies an anode the reformed gas(hydrogen gas) passing through the CO remover, and the air supplying hole which supplies a cathode the air and cooling water circulating hole 1480 and so on. Also, the cooling water can be circulated to remove the heat generated when the current is generated by an electric chemical reaction.

The current generated by the fuel cell part can be extracted as the direct current. The controlling part 1490 includes the converter and inverter 1495. Therefore, the controlling part 1490 can transform direct current to direct current or direct current to alternating current stably and transform the direct power to a predetermined form.

INDUSTRIAL APPLICABILITY

The present invention can improve the output density of the membrane electrode assembly that generates a current by electric chemical reaction in PEMC. Therefore the present invention results in a fuel cell having high-performance, small size, and low cost.

Also, the present invention can provide the membrane electrode assembly including a plurality of protuberances of the groove shape in comparison with the conventional membrane electrode assembly including the flat three-phase boundary.

Also, the present invention can increase the reaction surface area of the three-phase boundary in which the electric chemical reaction arises.

Also, the present invention can provide the method for the membrane electrode assembly in good reproducibility by decreasing the sliding generated in the hot-pressing process Also, the present invention has structural reliability relating to the exterior vibration generated while operating the fuel cell or assembling the stack Also, the present invention can decrease an ohmic resistance of hydrogen ion passing through the polymer electrolyte membrane by decreasing the thickness of the polymer electrolyte membrane.

Also, the present invention can increase the output density of the membrane electrode assembly compared with the conventional flat membrane electrode assembly coated with the same catalyst material.

Also, the present invention can reduce the number of membrane and separator during manufacturing of the fuel cell stack of the same output power compared with the conventional flat membrane electrode assembly.

Also, the present invention can produce new products in the super small-sized fuel cell field by applying the membrane electrode assembly according to the present invention.

Also, the present invention can be applied to fuel cells which supply fuel through porous electrode, for example, PEFC using fuel of gas state, DMFC using fuel of liquid state, and SOFC using electrolyte of solid state.

Although the present invention has been described in terms of various embodiments, it is not intended that the invention be limited to these embodiments. Modification within the spirit of the invention will be apparent to those skilled in the art in giving or receiving counseling.

The invention claimed is:

1. A method for producing a membrane electrode assembly generating electric current by electric chemical reaction comprising the steps of:

(a) forming a plurality of protuberances on one side of supporting bodies;

(b) forming a catalyst layer on one side of said supporting bodies on which said plurality of protuberances are formed;
(c) interposing a polymer electrolyte membrane between said supporting bodies;
(d) aligning said supporting bodies for said protuberances to engage each other; and
(e) hot-pressing said supporting bodies;

wherein a three phase boundary corresponding to said protuberances is formed;

wherein said (d) step is performed by inserting aligning members into pre-formed aligning halls; and wherein said aligning member has a plurality of protrusions different in size and height.

2. The method of claim 1, wherein said (a) step further comprises the steps of:
coating one side of said supporting bodies with a dry film;
exposing the one side of said supporting bodies;
developing said dry film; and
etching the one side of said supporting bodies physically.

3. The method of claim 2, wherein said dry film is developed by a spraying developer.

4. The method of claim 2, wherein said supporting bodies are etched by a sand blaster.

5. The method of claim 2, wherein the etching depth is hundreds of micrometers.

6. The method of claim 2 further comprising the step of combining a plate to the one side of said supporting bodies on which said protuberances are formed.

7. The method of claim 1, wherein said (a) step is performed by press processing.

8. The method of claim 1, wherein said (b) step is performed by spraying the one side of said supporting bodies with a catalyst mixed liquid by rotating said supporting bodies.

9. The method of claim 1, wherein said (c) step is performed by spraying the one side of said supporting bodies with a polymer electrolyte liquid.

10. The method of claim 1, wherein said (e) step is performed by inserting a spacer between said supporting bodies to uniform thickness of the polymer electrolyte membrane.

11. The method of claim 1, wherein said protuberances are at least one selected from a quadrangular prism, a triangular prism, a trapezoid prism, a hexahedron, and a quadrangular prismoid.

12. The method of claim 1, wherein an aspect ratio of said protuberances is from 0.01 to 6.

13. The method of claim 1, wherein an aspect ratio of said protuberances is from 0.05 to 3.

14. The method of claim 1, wherein a width of said protuberances is from 50 $\mu$m to 500 $\mu$m.

15. The method of claim 1, wherein a width of said protuberances is from 100 $\mu$m to 200 $\mu$m.

16. The method of claim 1, wherein a thickness of the polymer electrolyte membrane is from 10 $\mu$m to 200 $\mu$m.

* * * * *